US012431011B2

(12) United States Patent
Kimata et al.

(10) Patent No.: US 12,431,011 B2
(45) Date of Patent: Sep. 30, 2025

(54) TRAFFIC SAFETY SUPPORT SYSTEM AND LEARNING METHOD EXECUTABLE BY THE SAME

(71) Applicant: HONDA MOTOR CO., LTD., Tokyo (JP)

(72) Inventors: Akihito Kimata, Saitama (JP); Hirokazu Tokushima, Tokyo (JP); Shigeru Inoue, Saitama (JP); Yuji Takagi, Saitama (JP); Yoshitaka Mimura, Saitama (JP); Yoji Sasabuchi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 280 days.

(21) Appl. No.: 18/190,137

(22) Filed: Mar. 27, 2023

(65) Prior Publication Data

US 2023/0316898 A1 Oct. 5, 2023

(30) Foreign Application Priority Data

Mar. 31, 2022 (JP) ................................ 2022-060838

(51) Int. Cl.
*G08G 1/01* (2006.01)
*G08G 1/16* (2006.01)

(52) U.S. Cl.
CPC ......... *G08G 1/0116* (2013.01); *G08G 1/0125* (2013.01); *G08G 1/164* (2013.01); *G08G 1/166* (2013.01)

(58) Field of Classification Search
USPC .......................................................... 701/117
See application file for complete search history.

(56) References Cited

U.S. PATENT DOCUMENTS 5,822,712 A * 10/1998 Olsson ..................... G08G 1/08 340/934
6,662,141 B2 * 12/2003 Kaub ................... G08G 1/0104 702/181

(Continued)

FOREIGN PATENT DOCUMENTS

CN 104751642 A * 7/2015 ........... G08G 1/0133
CN 113744563 A * 12/2021 ............. G08G 1/167

(Continued)

OTHER PUBLICATIONS

Gindele, et al., "Learning Driver Behavior Models from Traffic Observations for Decision Making and Planning," in IEEE Intelligent Transportation Systems Magazine, vol. 7, No. 1, pp. 69-79, Spring 2015, doi: 10.1109/MITS.2014.2357038 (https://ieeexplore.ieee.org/document/7014400) (Year: 2015).*

(Continued)

*Primary Examiner* — Atul Trivedi
(74) *Attorney, Agent, or Firm* — CKC & PARTNERS CO., LLC

(57) ABSTRACT

A traffic safety support system includes a target traffic area recognizer configured to acquire recognition information regarding traffic participants, and the like, in a target traffic area, a predictor 62 configured to predict a risk in the target traffic area on the basis of the recognition information, and a coordination support information notifier 65 configured to transmit coordination support information to support targets. The predictor 62 includes an area risk predictor 620 configured to extract a high risk area from a plurality of local areas obtained by subdividing the target traffic area on the basis of information obtained by performing statistical processing on the recognition information, and a traffic participant risk predictor 625 configured to predict a risk in future of traffic participants in the high risk area on the basis of (Continued)

information related to the high risk area among the recognition information.

5 Claims, 7 Drawing Sheets

(56) References Cited

U.S. PATENT DOCUMENTS 10,830,605 B1 * 11/2020 Chintakindi ....... G01C 21/3461
11,279,361 B2 * 3/2022 Nishitani ............. G08G 1/0141
11,705,004 B2 * 7/2023 Bielby ................... G08G 1/052 701/117
11,735,037 B2 * 8/2023 Matus .................. G06V 20/584 701/117
11,776,390 B2 * 10/2023 Sakr ................. G08G 1/096783 701/117
2006/0095199 A1 * 5/2006 Lagassey ................ H04L 65/61 340/933
2009/0177602 A1 * 7/2009 Ning ..................... B60W 40/09 706/21
2016/0035222 A1 * 2/2016 Mikuni ................ G08G 1/0137 701/117
2018/0082189 A1 * 3/2018 Cormier ................. G06N 5/022
2018/0082193 A1 * 3/2018 Cormier ................... G06N 7/01
2019/0102689 A1 * 4/2019 Lassoued ............... G07C 5/085
2019/0379592 A1 * 12/2019 Samadi ................. H04L 41/145
2020/0209871 A1 * 7/2020 Xiong ................... H04W 4/029
2020/0234582 A1 * 7/2020 Mintz .............. G08G 1/096811
2021/0001857 A1 * 1/2021 Nishitani ............. G05D 1/0088
2022/0058747 A1 * 2/2022 Crabtree ................ G06Q 40/08
2022/0383738 A1 * 12/2022 Lyu ...................... G08G 1/0112
2023/0196909 A1 * 6/2023 Tan ...................... G08G 1/0133 701/117
2023/0311922 A1 * 10/2023 Kimata ................. B60W 50/14
2023/0311927 A1 * 10/2023 Kadowaki ............. B60W 50/16 340/425.5
2023/0316898 A1 * 10/2023 Kimata ................ G08G 1/0116 701/117
2023/0316923 A1 * 10/2023 Oshima .................. G08G 1/166 701/301
2023/0326344 A1 * 10/2023 Kimata .................. G08G 1/166
2023/0326345 A1 * 10/2023 Kimata .................. G08G 1/166
2024/0112580 A1 * 4/2024 Kimata .................. G08G 1/166
2024/0112581 A1 * 4/2024 Hirano ................... G08G 1/164
2024/0410708 A1 * 12/2024 Fei ..................... G01C 21/3889
2024/0412637 A1 * 12/2024 Inoue ....................... G08G 1/09

FOREIGN PATENT DOCUMENTS

CN 119849948 A * 4/2025
CN 119992819 A * 5/2025
CN 120014820 A * 5/2025
CN 120069568 A * 5/2025
CN 120220390 A * 6/2025
EP 2654028 A1 * 10/2013 .......... B60W 30/095
EP 3171353 A1 * 5/2017 ........... G08G 1/0962
JP 2019106049 A * 6/2019
JP 2020135674 A 8/2020
JP 2021136001 A 9/2021
JP 2022030241 A 2/2022
JP 7136761 B2 * 9/2022
KR 20250078176 A * 6/2025 ............... H04N 7/18
WO WO-2025114187 A1 * 6/2025 ............. G08G 1/056

OTHER PUBLICATIONS

Du, et al., "Safety in Traffic Management Systems: A Comprehensive Survey," arXiv:2308.06204 Aug. 10, 2023 (https://doi.org/10.48550/arXiv.2308.06204) (Year: 2023).*
Hussain, et al., "A bi-level framework for real-time crash risk forecasting using artificial intelligence-based video analytics," Sci Rep. Feb. 19, 2024;14:4121. doi: 10.1038/s41598-024-54391-4 (https://pmc.ncbi.nlm.nih.gov/articles/PMC10876932/) (Year: 2024).*
Notification of Reasons for Refusal issued Jul. 29, 2025 in the JP Patent Application No. 2022-060838.

* cited by examiner

TRAFFIC SAFETY SUPPORT SYSTEM AND LEARNING METHOD EXECUTABLE BY THE SAME

This application is based on and claims the benefit of priority from Japanese Patent Application No. 2022-060838, filed on 31 Mar. 2022, the content of which is incorporated herein by reference.

BACKGROUND OF THE INVENTION

Field of the Invention

The present invention relates to a traffic safety support system and a learning method executable by the same. More specifically, the present invention relates to a traffic safety support system that supports safe movement of traffic participants as persons or mobile bodies, and a learning method executable by the traffic safety support system.

Related Art

In public traffic, various traffic participants, such as mobile bodies including four-wheeled automobiles, motorcycles, bicycles, etc. as well as pedestrians, move at different speeds in accordance with their individual intentions. As a technique for improving safety, convenience, and the like, for traffic participants in such public traffic, for example, Japanese Unexamined Patent Application, Publication No. 2021-136001 discloses a driving support device that assists a driver in safely driving a vehicle.

The driving support device disclosed in Japanese Unexamined Patent Application, Publication No. 2021-136001 includes a danger predictor configured to predict a level of danger of a vehicle on the basis of information regarding a traveling state and a surrounding environment of the vehicle, and an alarm controller configured to perform alarm operation with respect to a driver through sound, text display, and the like, on the basis of an evaluation result of the predicted level of danger. In a case where some kind of danger is predicted, the driving support device disclosed in Japanese Unexamined Patent Application, Publication No. 2021-136001 can prompt the driver to perform driving operation for avoiding the predicted danger, thereby making it possible to assist the driver in safe driving.

Patent Document 1: Japanese Unexamined Patent Application, Publication No. 2021-136001

SUMMARY OF THE INVENTION

However, in the invention disclosed in Japanese Unexamined Patent Application, Publication No. 2021-136001, a level of danger is predicted on the basis of information regarding a surrounding environment acquired by an on-board sensor such as a camera and a radar mounted on the own vehicle, and thus, a potential risk existing outside a detection range of the on-board sensor cannot be grasped.

To achieve appropriate support to address such a potential risk, it is conceivable to aggregate information regarding traffic participants present in a predetermined target traffic area to a sever that is connected communicatively with each traffic participant, whereby a stream of the traffic participants in the target traffic area is grasped from a higher perspective at the server.

However, if information regarding an enormous number of traffic participants present in the target traffic area is aggregated to the server in this manner, processing load at the server increases, which may inhibit provision of appropriate support to each traffic participant in the target traffic area in real time.

The present invention is directed to providing a traffic safety support system capable of improving safety, convenience and smoothness of traffic for a plurality of traffic participants present in a target traffic area.

(1) A traffic safety support system according to one aspect of the present invention includes: a recognizer configured to recognize recognition targets including traffic participants as persons or mobile bodies in a target traffic area and traffic environments of the traffic participants, and acquire recognition information regarding the recognition targets; a predictor configured to predict a risk in the target traffic area on the basis of the recognition information; and a transmitter configured to transmit support information generated on the basis of the recognition information and a prediction result from the predictor, to a support target determined from among a plurality of the traffic participants in the target traffic area. The predictor includes: an area risk predictor configured to extract, from a plurality of local areas obtained by subdividing the target traffic area, at least one area as a high risk area, on the basis of information obtained by performing statistical processing on the recognition information; and a traffic participant risk predictor configured to perform processing for predicting a risk in future of traffic participants present in the high risk area, on the basis of information related to the high risk area and included in the recognition information.

(2) In this case, the traffic participant risk predictor preferably does not perform the processing for predicting a risk on a local area that is included in the plurality of local areas and is not extracted as the high risk area by the area risk predictor.

(3) In this case, the area risk predictor preferably estimates a level of risk for each of the local areas, and the transmitter transmits first support information generated on the basis of a prediction result from the traffic participant risk predictor to support targets present in the high risk area from a plurality of the support targets and transmits second support information generated on the basis of an estimation result from the area risk predictor to support targets present in a low risk area outside the high risk area.

(4) A learning method of a traffic safety support system according to one aspect of the present invention is a learning method executable by the traffic safety support system according to any one of (1) to (3). According to the learning method, the area risk predictor extracts the high risk area by utilizing a macro risk estimation model that outputs a level of risk for each of the plurality of local areas upon receiving an input of information obtained by performing statistical processing on the recognition information, and, the traffic participant risk predictor predicts a risk in future of traffic participants present in the high risk area by utilizing a micro risk estimation model that outputs, upon receiving an input of information related to a predetermined local area and included in the recognition information, a risk in future of traffic participants present in the local area. The learning method includes: a step of preparing learning data using input data to the macro risk estimation model generated on the basis of the recognition information and an output from the micro risk estimation model, the output being provided in response to input of the recognition information to the micro risk estimation model; and a step of learning the macro risk estimation model using the learning data.

(5) A learning method of the traffic safety support system according to one aspect of the present invention is a learning method executable by the traffic safety support system according to any one of (1) to (3). According to the learning method, the area risk predictor extracts the high risk area by utilizing a macro risk estimation model that outputs a level of risk for each of a plurality of the local areas upon receiving an input of information obtained by performing statistical processing on the recognition information and, the traffic participant risk predictor predicts a risk in future of traffic participants in the high risk area by utilizing a micro risk estimation model that outputs, upon receiving an input of information related to a predetermined local area and included in the recognition information, a risk in future of traffic participants in the predetermined local area. The learning method includes a step of preparing learning data using input data to the macro risk estimation model generated on the basis of first recognition information acquired in a predetermined first period and correct data with respect to an output from the micro risk estimation model generated on the basis of second recognition information acquired in a second period immediately after the first period, and a step of learning an overall model that is a combination of the macro risk estimation model and the micro risk estimation model using the learning data.

(1) A traffic safety support system according to the present invention includes a recognizer configured to recognize recognition targets including traffic participants (including persons and mobile bodies) in a target traffic area and traffic environments of the traffic participants, and acquire recognition information regarding the recognition targets, a predictor configured to predict a risk in the target traffic area on the basis of the recognition information, and a transmitter configured to transmit support information generated on the basis of the recognition information and a prediction result from the predictor, to a support target determined from among a plurality of the traffic participants in the target traffic area. Further, in the predictor, an area risk predictor extracts, from a plurality of local areas obtained by subdividing the target traffic area, at least one area as a high risk area, and a traffic participant risk predictor predicts a risk in future of traffic participants in the high risk area. Here, when a high risk area is extracted from a plurality of local areas, the area risk predictor can extract the high risk area with less load than in a case where an enormous amount of recognition information regarding the recognition targets in the target traffic area is utilized as is, by using information obtained by performing statistical processing on the recognition information. Further, when a risk in the future of traffic participants in the high risk area is predicted, the traffic participant risk predictor can predict a risk in the future of the traffic participants with less load than in a case where an enormous amount of recognition information regarding the recognition targets in the target traffic area is utilized as is, by using information related to the high risk area among the recognition information regarding the recognition targets in the whole target traffic area. Thus, according to the present invention, appropriate support information generated on the basis of a prediction result can be provided in real time to traffic participants in the high risk area, so that it is possible to improve safety, convenience and smoothness of traffic in the target traffic area.

(2) In the present invention, the traffic participant risk predictor does not predict a risk in the future of traffic participants in other local areas that are not extracted as the high risk area by the area risk predictor from among a plurality of local areas. Thus, according to the present invention, it is possible to reduce load required for computation compared to a case where prediction processing is performed on all the local areas by the traffic participant risk predictor. Further, according to the present invention, load required for computation can be reduced by narrowing down the number of local areas on which prediction processing is to be performed, so that it is possible to improve prediction accuracy of a risk of traffic participants in the high risk area correspondingly. Thus, according to the present invention, appropriate support information generated on the basis of a prediction result with high accuracy can be provided in real time to traffic participants in the high risk area, so that it is possible to further improve safety, convenience and smoothness of traffic in the target traffic area.

(3) In the present invention, the area risk predictor estimates a level of risk for each of the local areas and extracts a high risk area from a plurality of the local areas on the basis of an estimation result of the level of the risk. Further, the transmitter transmits first support information generated on the basis of a relatively detailed prediction result from the traffic participant risk predictor, to support targets present in the high risk area from among a plurality of support targets in the whole target traffic area. This makes it possible to improve safety, convenience and smoothness of traffic for traffic participants in the high risk area. Further, the transmitter transmits second support information generated on the basis of an estimation result for each local area by the area risk predictor, to support targets present in a low risk area outside the high risk area from among a plurality of support targets in the whole target traffic area. This makes it possible to also improve safety, convenience and smoothness of traffic for traffic participants in the low risk area. In this manner, in the present invention, by changing support information in accordance with a level of risk for each of the local areas, it is possible to improve safety, convenience and smoothness of traffic for traffic participants in the whole target traffic area.

(4) In a learning method executable by a traffic safety support system according to the present invention, learning data is prepared by utilizing input data to a macro risk estimation model generated on the basis of recognition information and an output from a micro risk estimation model, the output being provided in response to an input of the recognition information to the micro risk estimation model, and further, the macro risk estimation model is learned using the learning data. In typical model learning, it is necessary to prepare correct data for evaluating whether an output from the model is right or wrong. In contrast, in the present invention, an output from the micro risk estimation model can be utilized as learning data for learning the macro risk estimation model, so that it is possible to construct a macro risk estimation model with high accuracy using a relatively simple method. Thus, according to the present invention, it is possible to improve accuracy of the macro risk estimation model while operating a service of providing support information to each traffic participant.

(5) In a learning method executable by a traffic safety support system according to the present invention, learning data is prepared using input data to a macro risk estimation model generated on the basis of first recognition information acquired in a first period and correct data with respect to an output from a micro risk estimation model generated on the basis of second recognition information acquired in a second period immediately after the first period, and an overall model that is a combination of the macro risk estimation model and the micro risk estimation model is further learned using the learning data. Thus, according to the present invention, the second recognition information obtained in the second period immediately after the first period can be utilized as data for evaluating whether an output from the overall model when the first recognition information is input is right or wrong, so that it is possible to improve accuracy of the overall model that is a combination of the macro risk estimation model and the micro risk estimation model. Thus, according to the present invention, it is possible to improve accuracy of the overall model while operating a service of providing support information to each traffic participant.

DETAILED DESCRIPTION OF THE INVENTION

A traffic safety support system according to one embodiment of the present invention will be described below with reference to the drawings.

Figure 1:
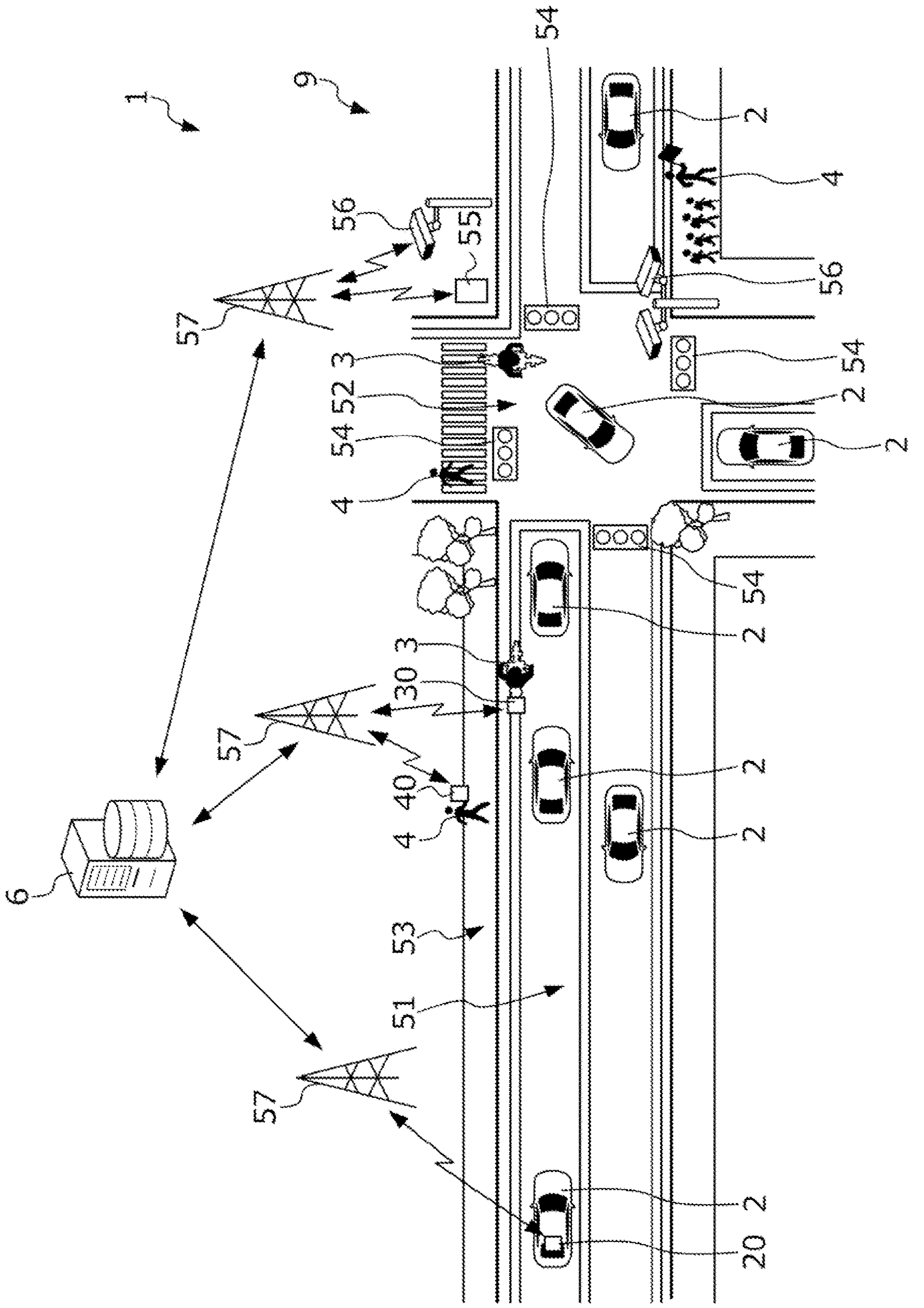
FIG. 1 is a view illustrating a configuration of a traffic safety support system according to one embodiment of the present invention and part of a target traffic area to be supported by the traffic safety support system.

FIG. 1 is a view schematically illustrating a configuration of a traffic safety support system 1 according to the present embodiment and part of a target traffic area 9 in which traffic participants to be supported by the traffic safety support system 1 are present.

The traffic safety support system 1 supports safe and smooth traffic of traffic participants in the target traffic area 9 by recognizing pedestrians 4 that are persons moving in the target traffic area 9 and four-wheeled vehicles 2, motorcycles 3, and the like, that are mobile bodies as individual traffic participants, notifying each traffic participant of support information generated through the recognition to encourage communication (specifically, for example, reciprocal recognition between the traffic participants) between the traffic participants that move on the basis of intentions of the traffic participants and recognition of a surrounding traffic environment.

FIG. 1 illustrates a case where an area around an intersection 52 in an urban area, including a road 51, the intersection 52, a pavement 53 and traffic lights 54 as traffic infrastructure equipment is set as the target traffic area 9. FIG. 1 illustrates a case where a total of seven four-wheeled vehicles 2 and a total of two motorcycles 3 move on the road 51 and at the intersection 52 and a total of three sets of pedestrians 4 move on the pavement 53 and at the intersection 52. Further, FIG. 1 illustrates a case where a total of three infrastructure cameras 56 are provided.

The traffic safety support system 1 includes on-board equipment 20 (including on-board devices mounted on the four-wheeled vehicles 2 and portable information processing terminals possessed or worn by drivers who drive the four-wheeled vehicles 2) that moves along with individual four-wheeled vehicles 2, on-board equipment 30 (including on-board devices mounted on the motorcycles 3 and portable information processing terminals possessed or worn by drivers who drive the motorcycles 3) that move along with individual motorcycles 3, portable information processing terminals 40 possessed or worn by the respective pedestrians 4, a plurality of the infrastructure cameras 56 provided in the target traffic area 9, a traffic light control device 55 that controls the traffic lights 54, and a coordination support device 6 connected to a plurality of terminals (hereinafter, also simply referred to as "area terminals") such as these on-board equipment 20 and 30, the portable information processing terminals 40, the infrastructure cameras 56 and the traffic light control device 55 installed in the target traffic area 9 so as to be able to perform communication.

The coordination support device 6 includes one or more computers connected to the above-described plurality of area terminals via a base station 57 so as to be able to perform communication. More specifically, the coordination support device 6 includes a server connected to the plurality of area terminals via the base station 57, a network core and the Internet, an edge server connected to the plurality of area terminals via the base station 57 and an MEC (multi-access edge computing) core, and the like.

Figure 2:
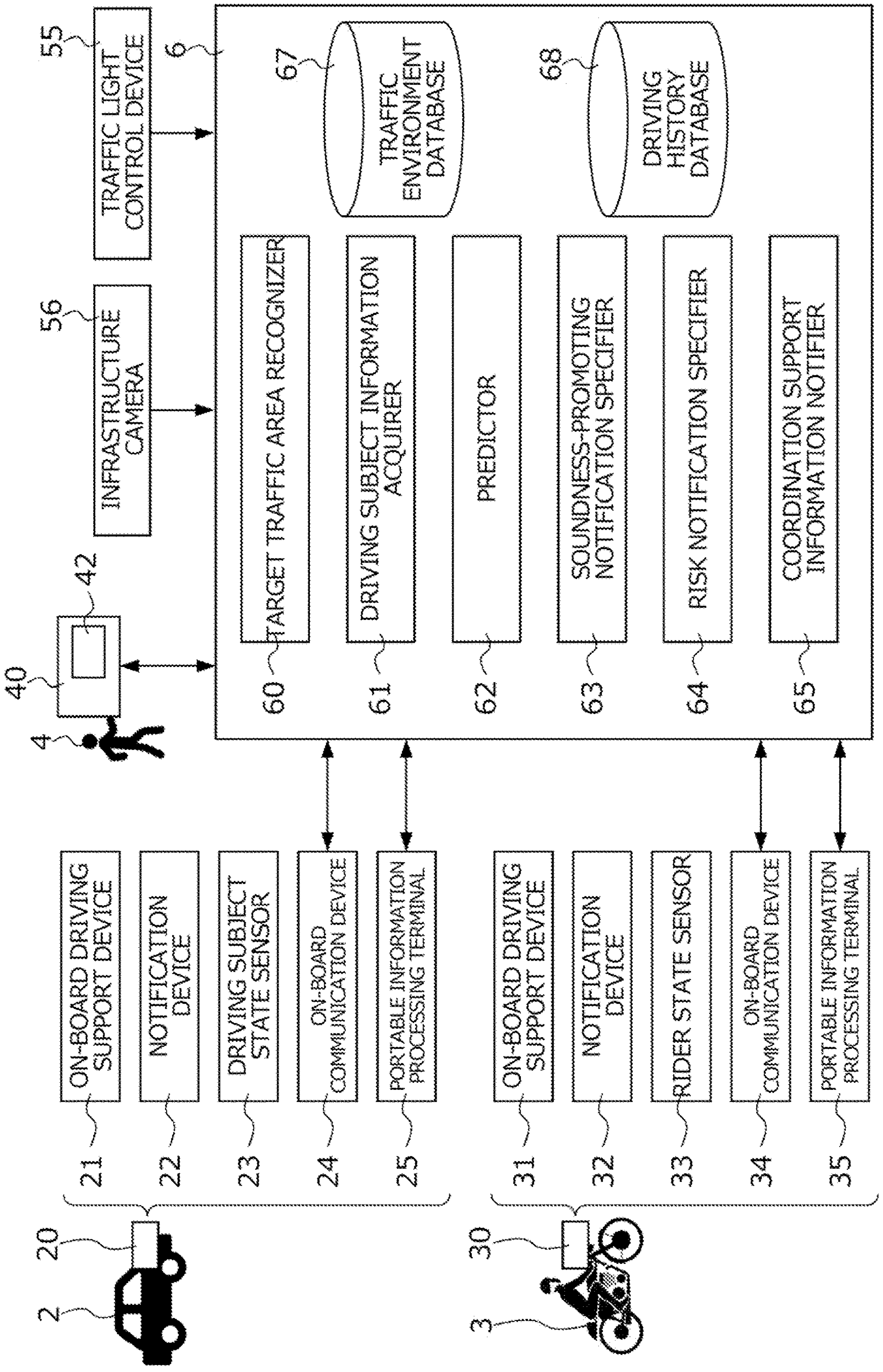
FIG. 2 is a block diagram illustrating a configuration of a coordination support device and a plurality of area terminals connected to the coordination support device so as to be able to perform communication.

FIG. 2 is a block diagram illustrating a configuration of the coordination support device 6 and a plurality of area terminals connected to the coordination support device 6 so as to be able to perform communication.

The on-board equipment 20 mounted on the four-wheeled vehicles 2 in the target traffic area 9 includes, for example, an on-board driving support device 21 that supports driving by a driver, a notification device 22 that notifies the driver of various kinds of information, a driving subject state sensor 23 that detects a state of the driver engaged in driving, an on-board communication device 24 that performs wireless communication between the own vehicle and the coordination support device 6 and other vehicles near the own vehicle, a portable information processing terminal 25 possessed or worn by the driver, and the like.

The on-board driving support device 21 includes an external sensor, an own vehicle state sensor, a navigation device, a driving support ECU, and the like. The external sensor includes an exterior camera that captures an image around the own vehicle, a plurality of on-board external sensors mounted on the own vehicle, such as a radar and a LIDAR (light detection and ranging) that detects a target outside the vehicle using an electromagnetic wave, and an outside recognition device that acquires information regarding a state around the own vehicle by performing sensor fusion processing on detection results from these on-board external sensors. The own vehicle state sensor includes a sensor that acquires information regarding a traveling state of the own vehicle, such as a vehicle speed sensor, an acceleration sensor, a steering angle sensor, a yaw rate sensor, a position sensor and an orientation sensor. The navigation device includes, for example, a GNSS receiver that specifies a current position of the own vehicle on the basis of a signal received from a GNSS (global navigation satellite system) satellite, a storage device that stores map information, and the like.

The driving support ECU executes driving support control such as lane departure prevention control, lane change control, preceding vehicle following control, erroneous start prevention control, collision mitigation brake control and collision avoidance control on the basis of the information acquired by the external sensor, the own vehicle state sensor, the navigation device, and the like. Further, the driving support ECU generates driving support information for supporting safe driving by the driver on the basis of the information acquired by the external sensor, the own vehicle state sensor, the navigation device, and the like, and transmits the driving support information to the notification device 22.

Here, the driving support ECU starts collision mitigation brake control of automatically operating a control device of the own vehicle so as to reduce damage by contact of the own vehicle and another mobile body on condition that there is a mobile body that may come into contact with the own vehicle within a predetermined collision mitigation brake actuation range around the own vehicle. Further, the driving support ECU starts collision avoidance control of automatically operating a steering device of the own vehicle to avoid contact of the own vehicle and another mobile body on condition that there is a mobile body that may come into contact with the own vehicle within a predetermined collision avoidance steering operation range around the own vehicle. In the following description, the collision mitigation brake actuation range and the collision avoidance steering operation range will be also collectively referred to as an "ADAS actuation range".

The driving subject state sensor 23 includes various devices that acquire time-series data of information correlated with driving capability of the driver engaged in driving. The driving subject state sensor 23 includes, for example, an on-board camera that detects a direction of a line of sight of the driver engaged in driving, whether or not the driver opens his/her eyes, and the like, a seat belt sensor that is provided at a seat belt to be fastened by the driver and detects a pulse of the driver, whether or not the driver breathes, and the like, a steering sensor that is provided at a steering to be gripped by the driver and detects a skin potential of the driver, and an on-board microphone that detects whether or not there is conversation between the driver and passengers.

The on-board communication device 24 has a function of transmitting the information acquired by the driving support ECU (including the information acquired by the external sensor, the own vehicle state sensor, the navigation device, and the like, control information regarding driving support control that is being executed, and the like), the information regarding the driving subject acquired by the driving subject state sensor 23, and the like, to the coordination support device 6, and a function of receiving coordination support information transmitted from the coordination support device 6 and transmitting the received coordination support information to the notification device 22.

The notification device 22 includes various devices that notify the driver of various kinds of information through auditory sense, visual sense, haptic sense, and the like, by causing a human machine interface (hereinafter, abbreviated as an "HMI") to operate in a manner determined on the basis of the driving support information transmitted from the on-board driving support device 21 and the coordination support information transmitted from the coordination support device 6.

Figure 3A:
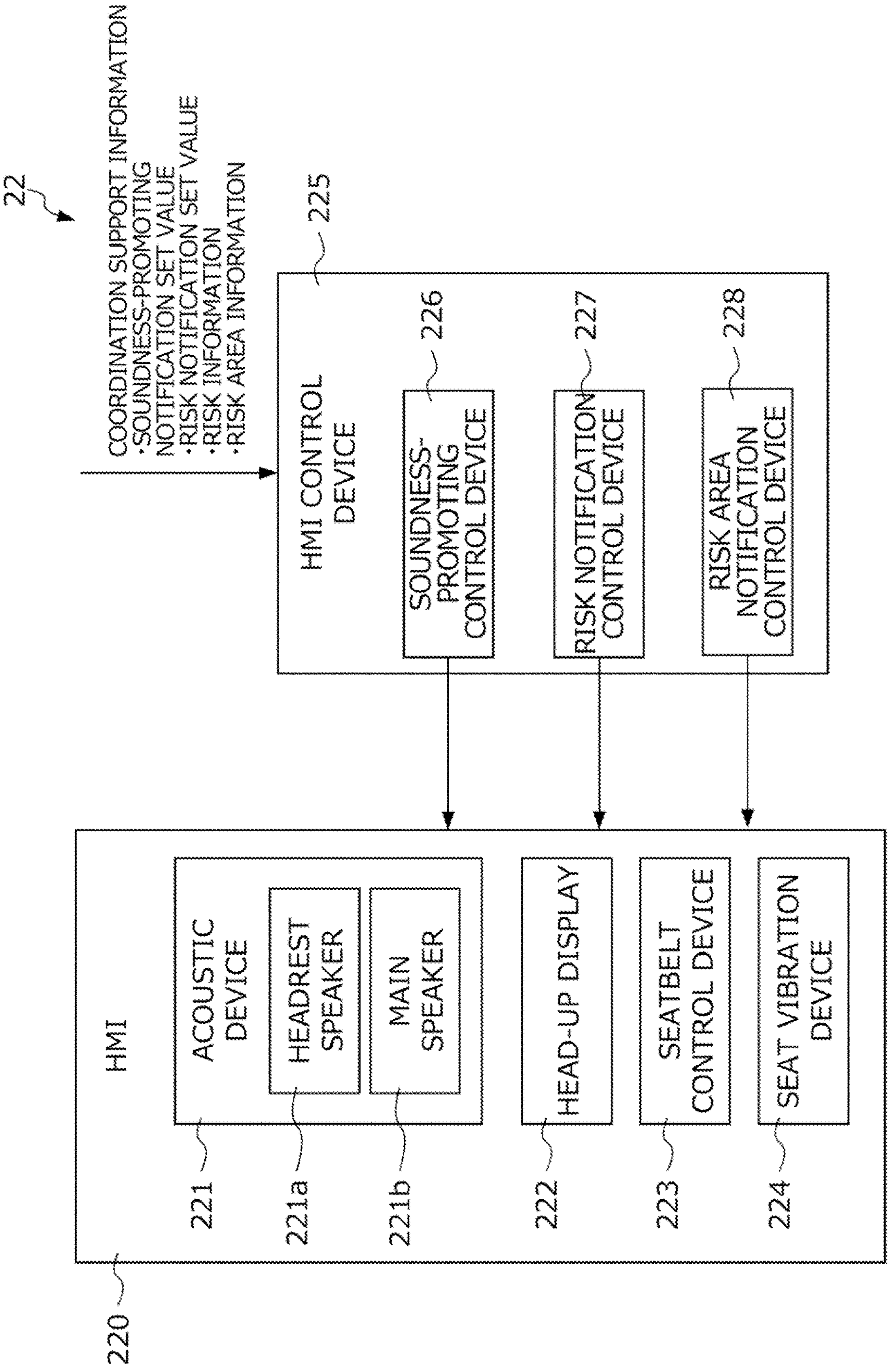
FIG. 3A is a block diagram illustrating a configuration of a notification device mounted on a four-wheeled vehicle.

FIG. 3A is a block diagram illustrating a configuration of the notification device 22 mounted on a four-wheeled vehicle. Note that FIG. 3A illustrates, within the notification device 22, only blocks particularly regarding control based on the coordination support information transmitted from the coordination support device 6.

The notification device 22 includes an HMI 220 that operates in a manner recognizable by the driver, and an HMI control device 225 that causes the HMI 220 to operate on the basis of the coordination support information transmitted from the coordination support device 6.

The HMI 220 includes an acoustic device 221 that operates in a manner auditorily recognizable by the driver, a head-up display 222 that operates in a manner visually recognizable by the driver, and a seat belt control device 223 and a seat vibration device 224 that operates in a manner haptically recognizable by the driver.

The acoustic device 221 includes a headrest speaker 221*a* that is provided at a headrest of a driver's seat to be seated by the driver and capable of emitting binaural sound having directivity, and a main speaker 221*b* that is provided in the vicinity of the driver's seat and a passenger's seat. The headrest speaker 221*a* and the main speaker 221*b* emit sound in accordance with a command from the HMI control device 225. The head-up display 222 displays an image in accordance with a command from the HMI control device 225 within a field of view (for example, a windshield) of the driver engaged in driving. The seat belt control device 223 changes tension of the seat belt to be fastened by the driver in accordance with a command from the HMI control device 225. The seat vibration device 224 vibrates the seat to be seated by the driver at an amplitude and/or a frequency in accordance with a command from the HMI control device 225.

The HMI control device 225 includes a soundness-promoting control device 226 configured to make a soundness-promoting notification for causing the HMI 220 to operate in a manner determined for bringing driving capability (particularly, cognitive capability) of a driver into a sound state, a risk notification control device 227 configured to make a risk notification for causing the HMI 220 to operate in a manner determined for causing the driver to recognize existence of a risk that comes near, and a risk area notification control device 228 configured to make a risk area notification for causing the HMI 220 to operate in a manner determined for causing the driver to recognize information regarding a risk in an area unit. As will be described later, the coordination support information to be transmitted from the coordination support device 6 to the four-wheeled vehicle 2 includes information regarding a soundness-promoting notification set value for setting ON/OFF of the soundness-promoting notification by the soundness-promoting control device 226, information regarding a risk notification set value for setting ON/OFF of the risk notification by the risk notification control device 227 and a type of a notification mode which will be described later, information regarding a risk that comes near to the driver (hereinafter, also referred to as "risk information"), risk area information to be used for risk area notification by the risk area notification control device 228, and the like.

The soundness-promoting notification set value to be input to the soundness-promoting control device 226 is set at one of "0" for setting OFF of the soundness-promoting notification by the soundness-promoting control device 226 and "1" for setting ON of the soundness-promoting notification by the soundness-promoting control device 226.

In a case where the soundness-promoting notification set value is "0", the soundness-promoting control device 226 sets OFF of the soundness-promoting notification. In other words, in a case where the soundness-promoting notification set value is "0", the soundness-promoting control device 226 does not cause the HMI 220 to operate. Note that this does not inhibit operation of the HMI 220 by the risk notification control device 227.

In a case where the soundness-promoting notification set value is "1", the soundness-promoting control device 226 sets ON of the soundness-promoting notification. More specifically, the soundness-promoting control device 226 brings driving capability of the driver into a sound state by, for example, playing music that attracts interest and attention of the driver using the headrest speaker 221*a* or the main speaker 221*b*. Note that in this event, to increase a degree of awareness of the driver, beats per minute (BPM) of the music may be changed, or a bass tone may be emphasized.

In this manner, the soundness-promoting control device 226 causes the HMI 220 to operate to bring driving capability of the driver into a sound state, and thus, in a case where the risk notification is set ON by the risk notification control device 227 which will be described later (that is, in a case where the risk notification set value is "1" or "2"), the soundness-promoting notification may be set to OFF so that the driver will not be annoyed. Further, while in the present embodiment, a case will be described where the soundness-promoting control device 226 brings driving capability into a sound state mainly via auditory sense of the driver by causing the headrest speaker 221*a* or the main speaker 221*b* to operate, the present invention is not limited to this. The soundness-promoting control device 226 may, for example, cause the seat belt control device 223 or the seat vibration device 224 to operate.

The risk notification control device 227 can make a risk notification in a plurality of notification modes in which at least one of a device to be caused to operate among those of the HMI 220 or an operation manner is different. More specifically, the risk notification control device 227 can make a risk notification in at least one of a hinting notification mode intended to cause the driver to recognize existence of a potential risk, an analogue notification mode intended to cause the driver to recognize existence of a visible risk and/or a level of the risk, or a prediction-assisted notification mode intended to notify the driver of information useful for avoiding a predicted risk. Thus, as the risk notification set value to be input to the risk notification control device 227, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 227 sets OFF of risk notification. In other words, in a case where the risk notification set value is "0", the risk notification control device 227 does not cause the HMI 220 to operate. Note that this does not inhibit operation of the HMI 220 by the soundness-promoting control device 226.

In a case where the risk notification set value is "1", the risk notification control device 227 sets the hinting notification mode as the notification mode and turns ON risk notification in the set notification mode.

In a case where the risk notification set value is "2", the risk notification control device 227 sets the analogue notification mode as the notification mode and turns ON risk notification in the set notification mode.

In a case where the risk notification set value is "3", the risk notification control device 227 sets the prediction-assisted notification mode as the notification mode and turns ON risk notification in the set notification mode.

In a case where the risk notification set value is "4", the risk notification control device 227 sets the hinting notification mode and the prediction-assisted notification mode as the notification modes and turns ON risk notification in these set notification modes.

Further, in a case where the risk notification set value is "5", the risk notification control device 227 sets the analogue notification mode and the prediction-assisted notification mode as the notification modes and turns ON risk notification in the set notification modes.

Here, in a case where the prediction-assisted notification mode is set as the notification mode, the risk notification control device 227 generates risk avoidance support information useful for avoiding a risk that comes near to the driver on the basis of the risk information transmitted from the coordination support device 6 and causes the acoustic device 221 and the head-up display 222 of the HMI 220 to operate in such a manner that enables the driver to auditorily and visually recognize the risk avoidance support information. Here, the risk avoidance support information includes information regarding a position of a traffic participant which may come into contact with the own vehicle (hereinafter, also referred to as a "risk-carrying subject"), information regarding a point at which the own vehicle may come into contact with the risk-carrying subject (hereinafter, also referred to as a "risk occurrence point"), and information including content that evokes attention of the driver to the risk-carrying subject.

More specifically, in a case where there is a motorcycle driven by an unsound rider ahead of the four-wheeled vehicle driven by the driver, the risk notification control device 227 emits a message having content of "Be careful of dangerous right-turn of the motorcycle" by the acoustic device 221 or displays the message on the head-up display 222 as the risk avoidance support information for avoiding contact with the motorcycle. Further, in this event, the risk notification control device 227 may display an image of an arrow indicating a current position or a predicted position of the motorcycle on the head-up display 222 as the risk avoidance support information for avoiding contact with the motorcycle.

Still further, in a case where the hinting notification mode is set as the notification mode, the risk notification control device 227 causes the driver to spontaneously recognize presence of a risk-carrying subject extracted from the risk information transmitted from the coordination support device 6 by causing the HMI 220 to operate in such a manner as not to annoy the driver. In such a hinting notification mode, in order to cause the driver to spontaneously recognize presence of a risk-carrying subject without annoying the driver, the risk notification control device 227 preferably causes the headrest speaker 221*a* that particularly appeals to auditory sense of the driver among the plurality of devices included in the HMI 220. More specifically, in a case where the hinting notification mode is set as the notification mode, the risk notification control device 227 spontaneously brings the line of sight of the driver to a position of the risk-carrying subject or a risk occurrence point by causing the headrest speaker 221*a* to emit a familiar sound effect with binaural sound having directivity directed to the position of the risk-carrying subject or the risk occurrence point at small volume.

Further, in a case where the analogue notification mode is set as the notification mode, the risk notification control device 227 causes the driver to strongly recognize presence of the risk-carrying subject extracted from the risk information transmitted from the coordination support device 6 and a level of the risk by the risk-carrying subject by causing the HMI 220 to operate in a manner different from the hinting notification mode described above. In this manner, in the analogue notification mode, to cause the driver to strongly recognize presence of the risk-carrying subject, the risk notification control device 227 causes the HMI 220 to operate in a manner with higher notification intensity than notification intensity of the manner set in the hinting notification mode. Here, the notification intensity refers to intensity of attracting concern and attention of the driver. More specifically, in a case where the analogue notification mode is set as the notification mode, the risk notification control device 227 causes the headrest speaker 221*a* and the main speaker 221*b* to emit buzzer sound or pulse sound at larger volume than the volume of the sound effect emitted in the hinting notification mode. The buzzer sound and the pulse sound are unfamiliar high-volume sound for the driver compared to the sound effect emitted in the hinting notification mode, and thus, the notification intensity is higher than the notification intensity of the sound effect emitted in the hinting notification mode.

Note that while in the present embodiment, a case will be described where the risk notification control device 227 causes the acoustic device 221 to operate in a case where the analogue notification mode is set as the notification mode, the present invention is not limited to this. In a case where the analogue notification mode is set as the notification mode, the risk notification control device 227 may cause the seat belt control device 223 to operate to change tension of the seat belt or cause the seat vibration device 224 to operate to vibrate the seat instead of causing the acoustic device 221 to operate. In this manner, the seat belt control device 223 and the seat vibration device 224 operate in a manner that appeals to haptic sense of the driver, and thus, the notification intensity is higher than the notification intensity of the sound effect emitted in the hinting notification mode. Further, in a case where the analogue notification mode is set as the notification mode, the risk notification control device 227 may cause the acoustic device 221, the seat belt control device 223 and the seat vibration device 224 to operate in combination.

Further, as described above, in the analogue notification mode, to cause the driver to strongly recognize a level of the risk by the risk-carrying subject in addition to presence of the risk-carrying subject, the risk notification control device 227 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 227 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens). In a case where the seat belt control device 223 is caused to operate as described above, the risk notification control device 227 may increase the notification intensity by increasing tension of the seat belt as the level of the risk becomes higher. Further, in a case where the seat vibration device 224 is caused to operate as described above, the risk notification control device 227 may increase the notification intensity by increasing an amplitude of vibration of the seat as the level of the risk becomes higher.

Further, in a case where the notification intensity is changed in accordance with the level of the risk in this manner, the risk notification control device 227 preferably causes the HMI 220 to operate so that the notification intensity becomes maximum at a time point at which execution of the collision mitigation brake control and the collision avoidance steering control is started by the driving support ECU described above, in other words, at a time point at which the risk-carrying subject enters the ADAS actuation range of the own vehicle.

The risk area notification control device 228 makes a risk area notification that notifies the driver of information regarding a current risk area by causing the HMI 220 to operate on the basis of risk area information sequentially transmitted from the coordination support device 6. As will be described later, the risk area information includes information regarding a current level of risk for each of the local areas obtained by subdividing the target traffic area. Thus, in a case where it is determined that the own vehicle is traveling in a local area with a high level of risk on the basis of the risk area information, the risk area notification control device 228, for example, emits using the main speaker 221*b* or displays on the head-up display 222, a message of "the vehicle is traveling in an area with high risk.

Please pay attention to surroundings".

Returning to FIG. 2, the portable information processing terminal 25 includes, for example, a wearable terminal to be worn by the driver of the four-wheeled vehicle 2, a smartphone possessed by the driver, and the like. The wearable terminal has a function of measuring biological information of the driver such as a heart rate, a blood pressure and a blood oxygen level and transmitting the measurement data of the biological information to the coordination support device 6 and a function of receiving the coordination support information transmitted from the coordination support device 6 and notifying the driver of a message in accordance with the coordination support information with an image, speech, warning sound, vibration, and the like. Further, the smartphone has a function of transmitting information regarding the driver such as position information, travel acceleration and schedule information of the driver to the coordination support device 6 and a function of receiving the coordination support information transmitted from the coordination support device 6 and notifying the driver of a message in accordance with the coordination support information with an image, speech, warning sound, melody, vibration, and the like.

The on-board equipment 30 mounted on the motorcycles 3 in the target traffic area 9 includes, for example, an on-board driving support device 31 that supports driving by a rider, a notification device 32 that notifies the rider of various kinds of information, a rider state sensor 33 that detects a state of the rider engaged in driving, an on-board communication device 34 that performs wireless communication between the own vehicle, and the coordination support device 6 and other vehicles near the own vehicle, a portable information processing terminal 35 possessed or worn by the rider, and the like.

The on-board driving support device 31 includes an external sensor, an own vehicle state sensor, a navigation device, a driving support ECU, and the like. The external sensor includes an exterior camera that captures an image around the own vehicle, a plurality of on-board external sensors mounted on the own vehicle such as a radar and a LIDAR that detects a target outside the vehicle by using an electromagnetic wave, and an outside recognition device that acquires information regarding a state around the own vehicle by performing fusion processing on detection results from the on-board exterior sensors. The own vehicle state sensor includes sensors that acquire information regarding a traveling state of the own vehicle such as a vehicle speed sensor and a five-axis or six-axis inertial measurement device. The navigation device includes, for example, a GNSS receiver that specifies a current position on the basis of a signal received from a GNSS satellite, a storage device that stores map information, and the like.

The driving support ECU executes driving support control such as lane keeping control, lane departure prevention control, lane change control, preceding vehicle following control, erroneous start prevention control and collision mitigation brake control on the basis of the information acquired by the external sensor, the own vehicle state sensor, the navigation device, and the like. Further, the driving support ECU generates driving support information for supporting safe driving by the rider on the basis of the information acquired by the external sensor, the own vehicle state sensor, the navigation device, and the like, and transmits the driving support information to the notification device 32.

Here, the driving support ECU starts collision mitigation brake control of automatically operating a brake device of the own vehicle to reduce damage by contact of the own vehicle and another mobile body on condition that there is a mobile body that may come into contact with the own vehicle within a predetermined collision mitigation brake actuation range (hereinafter, also referred to as an "ADAS actuation range" which is also used for a term defined for the four-wheeled vehicle 2) near the own vehicle.

The rider state sensor 33 includes various devices that acquire information correlated with driving capability of the rider engaged in driving. The rider state sensor 33 includes, for example, a seat sensor that is provided at a seat to be seated by the rider and detects a pulse, whether or not the rider breathes, and the like, a helmet sensor that is provided at a helmet to be worn by the rider and detects a pulse of the rider, whether or not the rider breathes, a skin potential, and the like.

The on-board communication device 34 has a function of transmitting the information acquired by the driving support ECU (including the information acquired by the external sensor, the own vehicle state sensor, the navigation device, and the like, and control information regarding driving support control that is being executed), information regarding the rider acquired by the rider state sensor 33, and the like, to the coordination support device 6 and a function of receiving the coordination support information transmitted from the coordination support device 6 and transmitting the received coordination support information to the notification device 32.

The notification device 32 includes various devices that notifies the rider of various kinds of information through auditory sense, visual sense, haptic sense, and the like, by causing the HMI to operate in a manner determined on the basis of the driving support information transmitted from the on-board driving support device 21 and the coordination support information transmitted from the coordination support device 6.

Figure 3B:
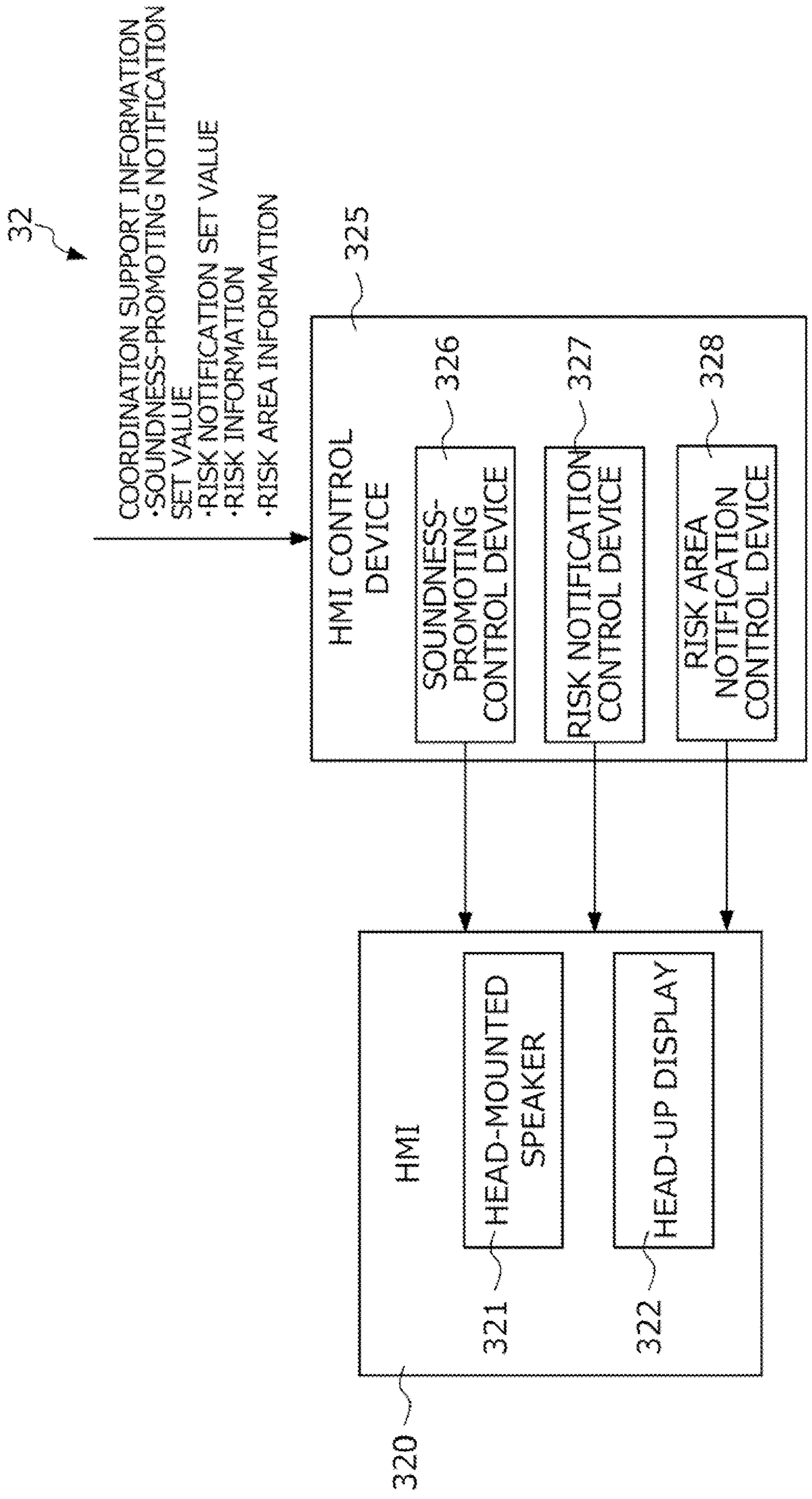
FIG. 3B is a block diagram illustrating a configuration of a notification device mounted on a motorcycle.

FIG. 3B is a block diagram illustrating a configuration of the notification device 32 mounted on the motorcycle. Note that FIG. 3B illustrates, within the notification device 32, only blocks particularly regarding control based on the coordination support information transmitted from the coordination support device 6.

The notification device 32 includes an HMI 320 that operates in a manner recognizable by the rider, and an HMI control device 325 that causes the HMI 320 to operate on the basis of the coordination support information transmitted from the coordination support device 6.

The HMI 320 includes a head-mounted speaker 321 that operates in a manner auditorily recognizable by the rider, and a head-up display 322 that operates in a manner visually recognizable by the rider.

The head-mounted speaker 321 is provided at a helmet to be worn by the rider and is capable of emitting binaural sound having directivity. The head-mounted speaker 321 emits sound in accordance with a command from the HMI control device 325. The head-up display 322 displays an image in accordance with a command from the HMI control device 325 within a field of view (for example, a shield of the helmet) of the rider engaged in driving.

The HMI control device 325 includes a soundness-promoting control device 326 configured to make a soundness-promoting notification for causing the HMI 320 to operate in a manner determined for bringing driving capability (particularly, cognitive capability) of the rider into a sound state, a risk notification control device 327 configured to make a risk notification for causing the HMI 320 to operate in a manner determined for causing the rider to recognize existence of a risk that comes near, and a risk area notification control device 328 configured to make a risk area notification for causing the HMI 320 to operate in a manner determined for causing the rider to recognize information regarding a risk in an area unit. As will be described later, the coordination support information to be transmitted from the coordination support device 6 to the motorcycle 3 includes information regarding a soundness-promoting notification set value for setting ON/OFF of the soundness-promoting notification by the soundness-promoting control device 326, information regarding a risk notification set value for setting ON/OFF of the risk notification by the risk notification control device 327 and a type of a notification mode, risk information regarding a risk that comes near to the rider, risk area information to be used for the risk area notification by the risk area notification control device 328, and the like.

The soundness-promoting notification set value to be input to the soundness-promoting control device 326 is set at one of "0" for setting OFF of the soundness-promoting notification by the soundness-promoting control device 326 and "1" for setting ON of the soundness-promoting notification by the soundness-promoting control device 326.

In a case where the soundness-promoting notification set value is "0", the soundness-promoting control device 326 sets OFF of the soundness-promoting notification. In other words, in a case where the soundness-promoting notification set value is "0", the soundness-promoting control device 326 does not cause the HMI 320 to operate. Note that this does not inhibit operation of the HMI 320 by the risk notification control device 327.

In a case where the soundness-promoting notification set value is "1", the soundness-promoting control device 326 sets ON of the soundness-promoting notification. More specifically, the soundness-promoting control device 326 brings driving capability of the rider into a sound state by playing music that attracts interest or attention of the rider using, for example, the head-mounted speaker 321. Note that in this event, to increase a degree of awareness of the rider, BPM of the music may be changed, or a bass tone may be emphasized.

In this manner, the soundness-promoting control device 326 causes the HMI 320 to operate to bring driving capability of the rider into a sound state, and thus, in a case where the risk notification by the risk notification control device 327 which will be described later is set ON (that is, in a case where the risk notification set value is "1" or "2"), the soundness-promoting notification may be set to OFF in such a manner as not to annoy the driver.

The risk notification control device 327 can make a risk notification in a plurality of notification modes in which at least one of a device to be caused to operate among those of the HMI 320 or an operation manner is different. More specifically, the risk notification control device 327 can make a risk notification in at least one of a hinting notification mode intended to cause the rider to recognize existence of a potential risk, an analogue notification mode intended to cause the rider to recognize existence of a visible risk and/or a level of the risk, or a prediction-assisted notification mode intended to notify the rider of information useful for avoiding a predicted risk. Thus, as the risk notification set value to be input to the risk notification control device 327, one of "0" for setting OFF of risk notification, "1" for setting ON of risk notification in the hinting notification mode, "2" for setting ON of risk notification in the analogue notification mode, "3" for setting ON of risk notification in the prediction-assisted notification mode, "4" for setting ON of risk notification in the hinting notification mode and the prediction-assisted notification mode, and "5" for setting ON of risk notification in the analogue notification mode and the prediction-assisted notification mode is set.

In a case where the risk notification set value is "0", the risk notification control device 327 sets OFF of risk notification. In other words, in a case where the risk notification set value is "0", the risk notification control device 327 does not cause the HMI 320 to operate. Note that this does not inhibit operation of the HMI 320 by the soundness-promoting control device 326.

In a case where the risk notification set value is "1", the risk notification control device 327 sets the hinting notification mode as the notification mode and turns ON risk notification in the set notification mode.

In a case where the risk notification set value is "2", the risk notification control device 327 sets the analogue notification mode as the notification mode and turns ON risk notification in the set notification mode.

In a case where the risk notification set value is "3", the risk notification control device 327 sets the prediction-assisted notification mode as the notification mode and turns ON risk notification in the set notification mode.

In a case where the risk notification set value is "4", the risk notification control device 327 sets the hinting notification mode and the prediction-assisted notification mode as the notification modes and turns ON risk notification in the set notification modes.

In a case where the risk notification set value is "5", the risk notification control device 327 sets the analogue notification mode and the prediction-assisted notification mode as the notification modes and turns ON risk notification in the set notification modes.

Here, in a case where the prediction-assisted notification mode is set as the notification mode, the risk notification control device 327 generates risk avoidance support information useful for avoiding a risk that comes near to the rider on the basis of the risk information transmitted from the coordination support device 6 and causes the head-mounted speaker 321 and the head-up display 322 of the HMI 320 to operate in such an manner that enables the rider to visually and auditorily recognize the risk avoidance support information. Here, the risk avoidance support information includes information regarding a position of a risk-carrying subject that may come into contact with the own vehicle, information regarding a risk occurrence point and information including content that evokes attention of the rider to the risk-carrying subject.

More specifically, in a case where there is a four-wheeled vehicle driven by an unsound driver ahead of the motorcycle driven by the rider, the risk notification control device 327 causes the head-mounted speaker 321 to emit a message indicating content of "Be careful of dangerous right-turn of the four-wheeled vehicle" or causes the head-up display 322 to display the message as the risk avoidance support information for avoiding contact with the four-wheeled vehicle. Further, in this event, the risk notification control device 327 may cause the head-up display 322 to display an image of an arrow indicating a current position or a predicted position of the four-wheeled vehicle as the risk avoidance support information for avoiding contact with the four-wheeled vehicle.

Further, in a case where the hinting notification mode is set as the notification mode, the risk notification control device 327 causes the rider to spontaneously recognize presence of a risk-carrying subject extracted from the risk information transmitted from the coordination support device 6 by causing the HMI 320 to operate in such a manner as not to annoy the driver. In such a hinting notification mode, to cause the rider to spontaneously recognize presence of the risk-carrying subject without annoying the driver, the risk notification control device 327 preferably causes particularly the head-mounted speaker 321 that appeals to auditory sense of the rider to operate among the plurality of devices included in the HMI 320. More specifically, in a case where the hinting notification mode is set as the notification mode, the risk notification control device 327 spontaneously brings the line of sight of the rider to a position of the risk-carrying subject or the risk occurrence point by causing the head-mounted speaker 321 to emit low-volume familiar sound effect with binaural sound having directivity directed to the position of the risk-carrying subject or the risk occurrence point.

In a case where the analogue notification mode is set as the notification mode, the risk notification control device 327 causes the rider to strongly recognize presence of the risk-carrying subject extracted from the risk information transmitted from the coordination support device 6 and a level of the risk by the risk-carrying subject by causing the HMI 320 to operate in a manner different from the hinting notification mode described above. In this manner, in the analogue notification mode, to cause the rider to strongly recognize presence of the risk-carrying subject, the HMI control device 325 causes the HMI 320 to operate in a manner with notification intensity higher than notification intensity in a manner set in the hinting notification mode. More specifically, in a case where the analogue notification mode is set as the notification mode, the risk notification control device 327 causes the head-mounted speaker 321 to emit buzzer sound or pulse sound at larger volume than a volume of the sound effect emitted in the hinting notification mode. The buzzer sound and the pulse sound are unfamiliar high-volume sound for the rider compared to the sound effect emitted in the hinting notification mode, and thus, the notification intensity is higher than the notification intensity of the sound effect emitted in the hinting notification mode.

Further, as described above, to cause the rider to strongly recognize the level of the risk by the risk-carrying subject in addition to presence of the risk-carrying subject, the risk notification control device 327 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the risk notification control device 327 may increase the notification intensity by increasing a volume of the buzzer sound, increasing a volume of the pulse sound or shortening an interval of the pulse sound as the level of the risk becomes higher (i.e., as the predicted period until the possible collision with the risk-carrying subject shortens).

Further, in a case where the notification intensity is changed in accordance with the level of the risk in this manner, the risk notification control device 327 preferably causes the HMI 320 to operate so that the notification intensity becomes maximum at a time point at which execution of collision mitigation brake control is started by the driving support ECU described above, in other words, at a time point at which the risk-carrying subject enters the ADAS actuation range.

The risk area notification control device 328 makes a risk area notification for notifying the driver of information regarding a current risk area by causing the HMI 320 to operate on the basis of the risk area information sequentially transmitted from the coordination support device 6. In a case where it is determined that the own vehicle is traveling in a local area with a high level of risk on the basis of the risk area information, the risk area notification control device 328 emits using the head-mounted speaker 321 or displays on the head-up display 322, a message of "the vehicle is traveling in an area with high risk.

Please pay attention to surroundings".

Returning to FIG. 2, the portable information processing terminal 40 possessed or worn by the pedestrian 4 in the target traffic area 9 includes, for example, a wearable terminal to be worn by the pedestrian 4, a smartphone possessed by the pedestrian 4, and the like. The wearable terminal has a function of measuring biological information of the pedestrian 4 such as a heart rate, a blood pressure and a blood oxygen level and transmitting the measurement data of the biological information to the coordination support device 6 and receiving the coordination support information transmitted from the coordination support device 6. Further, the smartphone has a function of transmitting pedestrian information regarding the pedestrian 4 such as position information, travel acceleration, schedule information, and the like, of the pedestrian 4 to the coordination support device 6 and receiving the coordination support information transmitted from the coordination support device 6.

Further, the portable information processing terminal 40 includes a notification device 42 that notifies the pedestrian of various kinds of information through auditory sense, visual sense, haptic sense, and the like, of the pedestrian by causing the HMI to operate in a manner determined on the basis of the received coordination support information.

Figure 3C:
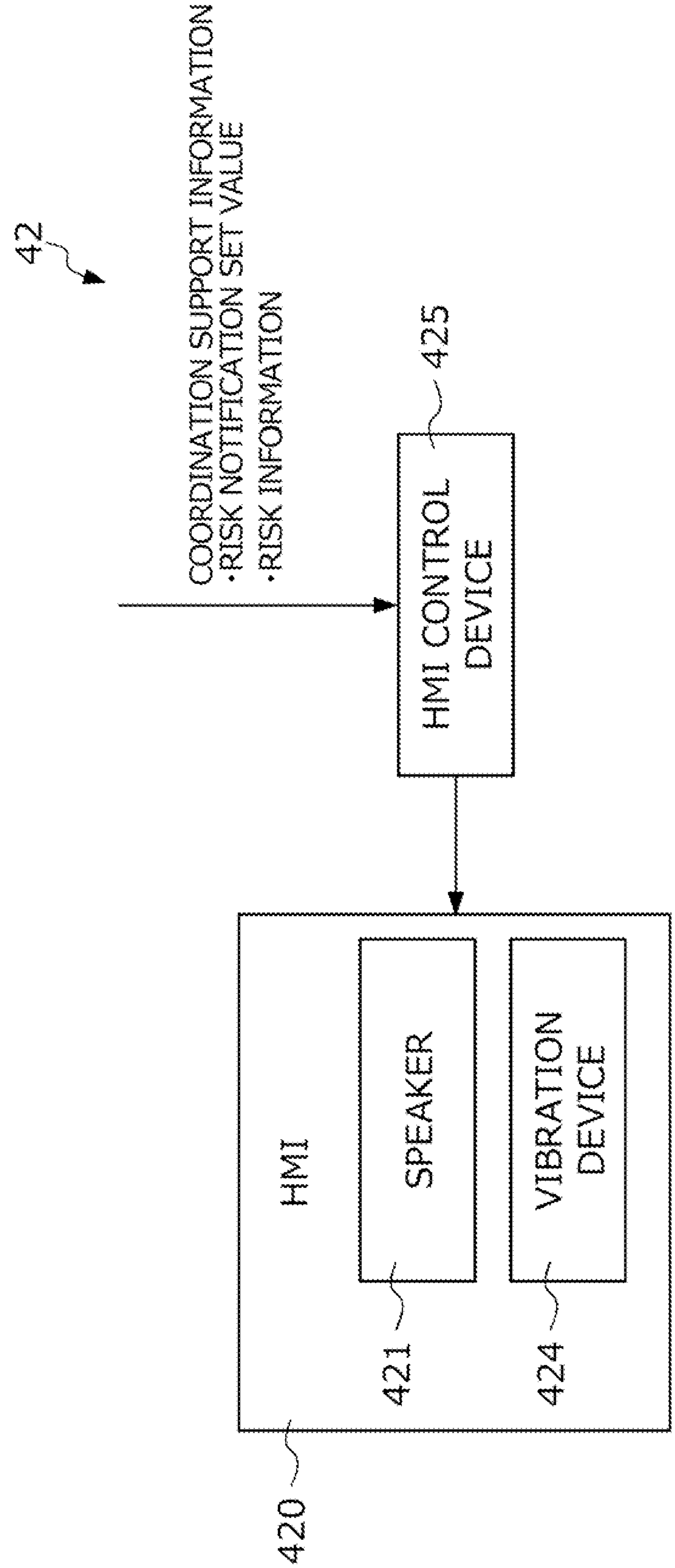
FIG. 3C is a block diagram illustrating a configuration of a notification device mounted on a portable information processing terminal possessed by a pedestrian.

FIG. 3C is a block diagram illustrating a configuration of the notification device 42 mounted on the portable information processing terminal 40. Note that FIG. 3C illustrates, within the notification device 42, only blocks particularly regarding control based on the coordination support information transmitted from the coordination support device 6.

The notification device 42 includes an HMI 420 that operates in a manner recognizable by the pedestrian, and an HMI control device 425 that causes the HMI 420 to operate on the basis of the coordination support information transmitted from the coordination support device 6.

The HMI 420 includes a speaker 421 that operates in a manner auditorily recognizable by the pedestrian, and a vibration device 424 that operates in a manner haptically recognizable by the pedestrian.

The speaker 421 emits sound in accordance with a command from the HMI control device 425. The vibration device 424 vibrates a body of the portable information processing terminal 40 at an amplitude and/or a frequency in a manner in accordance with a command from the HMI control device 425.

As will be described later, the coordination support information transmitted from the coordination support device 6 to the portable information processing terminal 40 possessed by the pedestrian includes information regarding a risk notification set value for setting ON/OFF of risk notification and a type of the notification mode to be set by the HMI control device 425, risk information regarding a risk that comes near to the pedestrian, and the like.

The HMI control device 425 can make a risk notification in a plurality of notification modes in which at least one of a device to be caused to operate among those of the HMI 420 or an operation manner is different. More specifically, the HMI control device 425 can make a risk notification in at least one of a hinting notification mode intended to cause the pedestrian to recognize existence of a potential risk or an analogue notification mode intended to cause the pedestrian to recognize existence of a visible risk and/or a level of the risk. Thus, as the risk notification set value to be input to the HMI control device 425, one of "0" for setting OFF of risk notification by the HMI control device 425, "1" for setting ON of the risk notification by the HMI control device 425 and setting the hinting notification mode as the notification mode and "2" for setting ON of risk notification by the HMI control device 425 and setting the analogue notification mode as the notification mode is set.

In a case where the risk notification set value is "0", the HMI control device 425 sets OFF of risk notification. In other words, in a case where the risk notification set value is "0", the HMI control device 425 does not cause the HMI 420 to operate.

In a case where the risk notification set value is "1", the HMI control device 425 sets the hinting notification mode as the notification mode and turns ON risk notification in the set notification mode.

In a case where the risk notification set value is "2", the HMI control device 425 sets the analogue notification mode as the notification mode and turns ON risk notification in the set notification mode.

Here, the HMI control device 425 causes the pedestrian to spontaneously recognize presence of a risk-carrying subject extracted from the risk information transmitted from the coordination support device 6 by causing the HMI 420 to operate in such a manner as not to annoy the driver. More specifically, in a case where the hinting notification mode is set as the notification mode, the HMI control device 425 vibrates the body of the portable information processing terminal 40 at a predetermined amplitude and frequency by causing the vibration device 424 to operate.

Further, in a case where the analogue notification mode is set as the notification mode, the HMI control device 425 causes the pedestrian to strongly recognize presence of a risk-carrying subject extracted from the risk information transmitted from the coordination support device 6 and a level of risk by the risk-carrying subject by causing the HMI 420 to operate in a manner different from the hinting notification mode described above. In this manner, in the analogue notification mode, to cause the pedestrian to strongly recognize presence of the risk-carrying subject, the HMI control device 425 causes the HMI 420 to operate in a manner with notification intensity higher than notification intensity in a manner set in the hinting notification mode. More specifically, in a case where the analogue notification mode is set as the notification mode, the HMI control device 425 causes the speaker 421 to emit buzzer sound, pulse sound, a message indicating that there is a risk, or the like.

Further, as described above, in the analogue notification mode, to cause the pedestrian to strongly recognize a level of the risk by the risk-carrying subject in addition to presence of the risk-carrying subject, the HMI control device 425 preferably changes the notification intensity in accordance with the level of the risk by the risk-carrying subject (e.g., the length of a predicted period until a possible collision with the risk-carrying subject) extracted from the risk information transmitted from the coordination support device 6. Specifically, the HMI control device 425 may increase the notification intensity by increasing a volume of the buzzer sound, increasing a volume of the pulse sound, shortening an interval of the pulse sound, increasing a volume of the message or changing content of the message as the level of the risk becomes higher (i.e., as the predicted period until the possible collision with the risk-carrying subject shortens).

Returning to FIG. 2, the infrastructure camera 56 captures images of traffic infrastructure equipment including a road, an intersection and a pavement in a target traffic area and mobile bodies and pedestrians that move on the road, the intersection, the pavement, and the like, and transmits the obtained image information to the coordination support device 6.

The traffic light control device 55 controls the traffic lights and transmits traffic light state information regarding current lighting color of the traffic lights provided in the target traffic area, a timing at which the lighting color is switched, and the like, to the coordination support device 6.

The coordination support device 6 is a computer that supports safe and smooth traffic of the traffic participants in the target traffic area by generating coordination support information for encouraging communication between the traffic participants and recognition of a surrounding traffic environment for each traffic participant to be supported on the basis of the information acquired from a plurality of area terminals present in the target traffic area as described above and notifying each traffic participant. Note that in the present embodiment, traffic participants including means for receiving the coordination support information generated at the coordination support device 6 and causing the HMI to operate in a manner set on the basis of the received coordination support information (for example, the on-board equipment 20 and 30, the portable information processing terminal 40 and the notification devices 22, 32 and 42) among the plurality of traffic participants present in the target traffic area are set as targets to be supported by the coordination support device 6.

The coordination support device 6 includes a target traffic area recognizer 60 configured to recognize persons and mobile bodies in the target traffic area as individual traffic participants, a driving subject information acquirer 61 configured to acquire driving subject state information correlated with driving capability of driving subjects of the mobile bodies recognized as the traffic participants by the target traffic area recognizer 60, a predictor 62 configured to predict future of the traffic participants in the target traffic area, a soundness-promoting notification specifier 63 configured to set ON/OFF of the soundness-promoting notification for each of the traffic participants recognized as support targets by the target traffic area recognizer 60, a risk notification specifier 64 configured to set a notification mode of the risk notification for each of the traffic participants recognized as the support targets by the target traffic area recognizer 60, a coordination support information notifier 65 configured to transmit coordination support information generated for each of the traffic participants recognized as the support targets by the target traffic area recognizer 60, a traffic environment database 67 in which information regarding traffic environments of the target traffic area is accumulated, and a driving history database 68 in which information regarding past driving history by the driving subjects registered in advance is accumulated.

In the traffic environment database 67, information regarding traffic environments of the traffic participants in the target traffic area such as map information of the target traffic area registered in advance (for example, a width of the road, the number of lanes, speed limit, a width of the pavement, whether or not there is a guardrail between the road and the pavement, a position of a crosswalk) and dangerous area information regarding particularly dangerous areas within the target traffic area, is stored. In the following description, the information stored in the traffic environment database 67 will be also referred to as registered traffic environment information. Note that the dangerous area information to be stored in the traffic environment database 67 is different from the risk area information which will be described later in that while the dangerous area information is information updated with a period of several hours to several days, the risk area information is information updated substantially in real time.

In the driving history database 68, information regarding past driving history of the driving subjects registered in advance is stored in association with registration numbers of mobile bodies possessed by the driving subjects. Thus, if the registration numbers of the recognized mobile bodies can be specified by the target traffic area recognizer 60 which will be described later, the past driving history of the driving subjects of the recognized mobile bodies can be acquired by searching the driving history database 68 on the basis of the registration numbers. In the following description, the information stored in the driving history database 68 will also be referred to as registered driving history information.

The target traffic area recognizer 60 recognizes traffic participants that are persons or mobile bodies in the target traffic area and recognition targets including traffic environments of the respective traffic participants in the target traffic area on the basis of the information transmitted from the above-described area terminal (the on-board equipment 20 and 30, the portable information processing terminal 40, the infrastructure camera 56 and the traffic light control device 55) in the target traffic area and the registered traffic environment information read from the traffic environment database 67 and acquires recognition information regarding the recognition targets.

Here, the information transmitted from the on-board driving support device 21 and the on-board communication device 24 included in the on-board equipment 20 to the target traffic area recognizer 60 and the information transmitted from the on-board driving support device 31 and the on-board communication device 34 included in the on-board equipment 30 to the target traffic area recognizer 60 include information regarding traffic participants present near the own vehicle and a state regarding the traffic environment acquired by the external sensor, information regarding a state of the own vehicle as one traffic participant acquired by the own vehicle state sensor, the navigation device and the like, and the like. Further, the information transmitted from the portable information processing terminal 40 to the target traffic area recognizer 60 includes information regarding a state of a pedestrian as one traffic participant, such as a position and travel acceleration. Still further, the image information transmitted from the infrastructure camera 56 to the target traffic area recognizer 60 includes information regarding the respective traffic participants and traffic environments of the traffic participants, such as appearance of the traffic infrastructure equipment such as the road, the intersection and the pavement, and appearance of traffic participants moving in the target traffic area. Further, the traffic light state information transmitted from the traffic light control device 55 to the target traffic area recognizer 60 includes information regarding traffic environments of the respective traffic participants such as current lighting color of the traffic lights and a timing for switching the lighting color. Further, the registered traffic environment information to be read by the target traffic area recognizer 60 from the traffic environment database 67 includes information regarding traffic environments of the respective traffic participants such as map information, the dangerous area information, and the like, of the target traffic area.

Thus, the target traffic area recognizer 60 can acquire recognition information of each traffic participant (hereinafter, also referred to as "traffic participant recognition information") such as a position of each traffic participant in the target traffic area, moving speed, moving acceleration, direction of movement, a vehicle type of the mobile body, a vehicle rank, registration number of the mobile body, the number of people of the pedestrian and an age group of the pedestrian on the basis of the information transmitted from the area terminals. Further, the target traffic area recognizer 60 can acquire recognition information of the traffic environment (hereinafter, also referred to as "traffic environment recognition information") of each traffic participant in the target traffic area such as a width of the road, the number of lanes, speed limit, a width of the pavement, whether or not there is a guardrail between the road and the pavement, lighting color of the traffic light, a switching timing of the lighting color, weather, illuminance, road surface conditions, and the dangerous area information on the basis of the information transmitted from the area terminals.

Thus, in the present embodiment, the recognizer that recognizes the traffic participants in the target traffic area and the traffic environments includes the target traffic area recognizer 60, the on-board driving support device 21, the on-board communication device 24 and the portable information processing terminal 25 included in the on-board equipment 20 of the four-wheeled vehicle 2, the on-board driving support device 31, the on-board communication device 34 and the portable information processing terminal 35 included in the on-board equipment 30 of the motorcycle 3, the portable information processing terminal 40 of the pedestrian 4, the infrastructure camera 56, the traffic light control device 55 and the traffic environment database 67.

The target traffic area recognizer 60 transmits the traffic participant recognition information and the traffic environment recognition information acquired as described above to the driving subject information acquirer 61, the predictor 62, the soundness-promoting notification specifier 63, the risk notification specifier 64, the coordination support information notifier 65, and the like.

The driving subject information acquirer 61 acquires driving subject state information and driving subject characteristic information correlated with current driving capabilities of the driving subjects of the mobile bodies recognized as the traffic participants by the target traffic area recognizer 60 on the basis of the information transmitted from the above-described area terminals (particularly, the on-board equipment 20 and 30) in the target traffic area and the registered driving history information read from the driving history database 68.

More specifically, in a case where the driving subject of the four-wheeled vehicle recognized as the traffic participant by the target traffic area recognizer 60 is a person, the driving subject information acquirer 61 acquires the information transmitted from the on-board equipment 20 mounted on the four-wheeled vehicle as driving subject state information of the driver. Further, in a case where the driving subject of the motorcycle recognized as the traffic participant by the target traffic area recognizer 60 is a person, the driving subject information acquirer 61 acquires the information transmitted from the on-board equipment 30 mounted on the motorcycle as driving subject state information of the rider.

Here, the information to be transmitted from the driving subject state sensor 23 and the on-board communication device 24 included in the on-board equipment 20 to the driving subject information acquirer 61 includes time-series data regarding appearance information such as a direction of a line of sight of the driver engaged in driving and whether or not the driver opens his/her eyes, biological information such as a pulse, whether or not the driver breathes, and a skin potential, speech information such as whether or not there is conversation, and the like, which is correlated with driving capability of the driver who is driving. Further, the information to be transmitted from the rider state sensor 33 and the on-board communication device 34 included in the on-board equipment 30 to the driving subject information acquirer 61 includes time-series data regarding biological information such as a pulse of the rider, whether or not the rider breathes and a skin potential, which is correlated with driving capability of the rider engaged in driving. Further, the information to be transmitted from the portable information processing terminals 25 and 35 included in the on-board equipment 20 and 30 to the driving subject information acquirer 61 includes personal schedule information of the driver and the rider. In a case where the driver and the rider drive the mobile bodies, for example, under tight schedule, there is a case where the driver and the rider may feel pressed, and driving capabilities may degrade. Thus, it can be said that the personal schedule information of the driver and the rider is information correlated with the driving capabilities of the driver and the rider.

The driving subject information acquirer 61 acquires driving subject characteristic information regarding characteristics (such as, for example, too many times of sudden lane change and too many times of sudden acceleration and deceleration) regarding driving of the driving subject correlated with current driving capability of the driving body engaged in driving by using both or one of the driving subject state information for the driving subject acquired through the following procedure and the registered driving history information read from the driving history database 68.

The driving subject information acquirer 61 transmits the driving subject state information and the driving subject characteristic information of the driving subject acquired as described above to the predictor 62, the soundness-promoting notification specifier 63, the risk notification specifier 64, the coordination support information notifier 65 and the like.

The predictor 62 predicts a risk in the whole target traffic area on the basis of the traffic participant recognition information and the traffic environment recognition information (hereinafter, also collectively referred to as "recognition information") acquired by the target traffic area recognizer 60 and the driving subject state information and the driving subject characteristic information (hereinafter, also collectively referred to as "driving subject information") acquired by the driving subject information acquirer 61.

Figure 4:
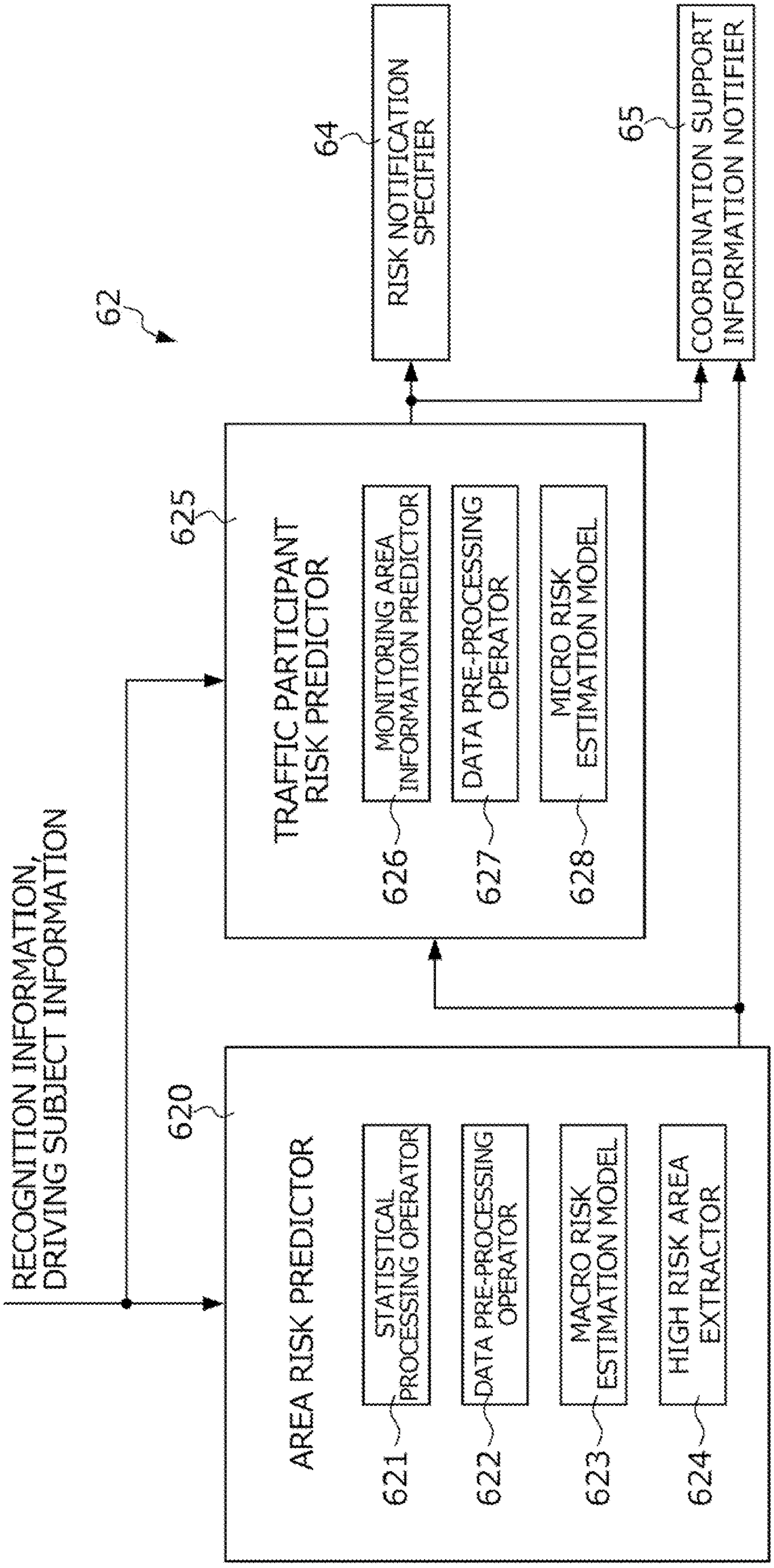
FIG. 4 is a functional block diagram illustrating a specific configuration of a predictor.

FIG. 4 is a functional block diagram illustrating a specific configuration of the predictor 62. The predictor 62 includes an area risk predictor 620 configured to predict a risk for traffic participants in units of a plurality of local areas obtained by subdividing the target traffic area, and a traffic participant risk predictor 625 configured to predict a risk for each of traffic participants present in each local area.

Here, the target traffic area is a traffic area that is a relatively wide range, for example, determined for each municipal government. In contrast, individual local areas obtained by subdividing the target traffic area are traffic areas, such as, for example, an intersection and vicinity of a specific facility, that can be passed within approximately several tens of seconds in a case where a four-wheeled vehicle moves at legal speed. In other words, the individual local areas are narrower than the target traffic area but are set wider than an ADAS actuation range by a driving support ECU mounted on each mobile body. Note that a range of each local area may be made fixed or may be changed in accordance with a situation. Further, part of the range of each local area may overlap with part of a range of another adjacent local area.

The area risk predictor 620 includes a statistical processing operator 621, a data pre-processing operator 622, a macro risk estimation model 623 and a high risk area extractor 624 and predicts a risk for each of the local areas using these.

The statistical processing operator 621 extracts information correlated with a level of risk for each of the local areas by performing predetermined statistical processing on the recognition information and the driving subject information regarding the whole target traffic area.

The data pre-processing operator 622 generates input data to the macro risk estimation model 623 on the basis of information subjected to the statistical processing by the statistical processing operator 621 and inputs the input data to the macro risk estimation model 623.

The macro risk estimation model 623 includes, for example, a DNN constructed through machine learning so as to output a level of risk for each of the local areas if input data subjected to the processing by the data pre-processing operator 622 is input. Information regarding the level of the risk for each of the local areas calculated by the macro risk estimation model 623 is transmitted to the high risk area extractor 624 and the coordination support information notifier 65.

The high risk area extractor 624 extracts at least one of a plurality of local areas that constitute the target traffic area as a high risk area on the basis of the level of the risk for each of the local areas calculated by the macro risk estimation model 623. More specifically, the high risk area extractor 624, for example, extracts a local area with the level of the risk calculated by the macro risk estimation model 623 higher than a predetermined threshold among the plurality of local areas as the high risk area. Information regarding the high risk area extracted by the high risk area extractor 624 is transmitted to the traffic participant risk predictor 625.

The traffic participant risk predictor 625 includes a monitoring area information extractor 626, a data pre-processing operator 627 and a micro risk estimation model 628 and predicts a risk in future of individual traffic participants in a monitoring area that is only the high risk area extracted by the area risk predictor 620 using these. In other words, the traffic participant risk predictor 625 does not set a local area (hereinafter, also referred to as a "low risk area") not extracted as the high risk area by the area risk predictor 620 among all the local areas as the monitoring area and does not perform processing which will be described below.

The monitoring area information extractor 626 extracts information related to the monitoring area extracted as the high risk area by the area risk predictor 620 among the recognition information and the driving subject information (that is, information regarding traffic participants present in the monitoring area and traffic environments of the traffic participants among the recognition information, and information regarding driving subjects of mobile bodies present in the monitoring area among the driving subject information).

The data pre-processing operator 627 generates input data to the micro risk estimation model 628 on the basis of the recognition information and the driving subject information regarding the monitoring area extracted by the monitoring area information extractor 626 and inputs the input data to the micro risk estimation model 628.

The micro risk estimation model 628, for example, includes a DNN constructed through machine learning so as to output information regarding a risk in future of each traffic participant in the monitoring area (more specifically, information regarding traffic lines of the individual traffic participants, information regarding a contact risk of each traffic participant, a predicted period until a possible collision, and the like) if the input data regarding the monitoring area subjected to the processing by the data pre-processing operator 622 is input. The information regarding the risk of the traffic participants in the monitoring area calculated by the micro risk estimation model 628 is transmitted to the risk notification specifier 64 and the coordination support information notifier 65.

As described above, the predictor 62 that predicts a risk in the target traffic area by utilizing a combination of the macro risk estimation model 623 and the micro risk estimation model 628 learns the macro risk estimation model 623 and the micro risk estimation model 628 through the following two types of procedure while the traffic safety support system 1 operates a service of providing the coordination support information to each traffic participant and can improve its prediction accuracy.

<First Learning Method>

A first learning method includes a step of preparing learning data using input data to a macro risk estimation model 623 generated on the basis of recognition information and driving subject information acquired during operation of a service and an output from a micro risk estimation model 628 when input data prepared using the same recognition information and the same driving subject information is input to the micro risk estimation model 628, and a step of learning the macro risk estimation model 623 using the learning data. The first learning method is useful in a case where the micro risk estimation model 628 with high accuracy can be obtained in advance because an output from the micro risk estimation model 628 is used as correct data.

<Second Learning Method>

A second learning method includes a step of preparing learning data using input data to a macro risk estimation model 623 generated on the basis of first recognition information and first driving subject information acquired in a predetermined first period during operation of a service and correct data with respect to an output from a micro risk estimation model 628 generated on the basis of second recognition information and second driving subject information acquired in a second period immediately after the first period, and a step of learning an overall model that is a combination of the macro risk estimation model 623 and the micro risk estimation model 628 using the learning data. While the second learning method requires work compared to the first learning method because the correct data is required to be manually prepared on the basis of the second recognition method, in the second learning method, both the macro risk estimation model 623 and the micro risk estimation model 628 can be learned, so that it is possible to improve prediction accuracy of the whole predictor 62 compared to the first learning method.

Returning to FIG. 2, the soundness-promoting notification specifier 63 sets ON/OFF of the soundness-promoting notification for each of setting targets that are traffic participants recognized as support targets and mobile bodies by the target traffic area recognizer 60 among a plurality of traffic participants present in the target traffic area. Note that as will be described later, the traffic participants that are parties involved with the contact risk predicted to occur by the predictor 62 described above become setting targets of risk notifications by the risk notification specifier 64. It is therefore preferable to exclude the setting targets by the risk notification specifier 64 from setting targets by the soundness-promoting notification specifier 63.

More specifically, first, the soundness-promoting notification specifier 63 acquires driving subject state information and driving subject characteristic information associated with the driving subject of each setting target that is a mobile body from the driving subject information acquirer 61. Further, the soundness-promoting notification specifier 63 calculates current soundness of the driving subject for each of the setting targets on the basis of the acquired driving subject state information and driving subject characteristic information. Further, in a case where the soundness calculated for each of the setting targets is less than a predetermined soundness threshold, the soundness-promoting notification specifier 63 determines that the driving subject of the setting target is in an unsound state and sets the soundness-promoting notification set value to "1" to the setting target to set ON of the soundness-promoting notification to the setting target. Further, in a case where the soundness calculated for each setting target is equal to or greater than the soundness threshold, the soundness-promoting notification specifier 63 determines that the driving subject of the setting target is in a sound state and sets the soundness-promoting notification set value for the setting target to "0" to set OFF of the soundness-promoting notification of the setting target.

The soundness-promoting notification specifier 63 sets ON or OFF of the soundness-promoting notification for the plurality of setting targets in the target traffic area through the procedure as described above. Information regarding the soundness-promoting notification set value set for each setting target by the soundness-promoting notification specifier 63 is transmitted to the coordination support information notifier 65.

The risk notification specifier 64 sets an operation manner (that is, sets a type of a notification mode and ON/OFF of the risk notification) of the risk notification for each of setting targets that are traffic participants recognized as support targets by the target traffic area recognizer 60 among a plurality of traffic participants present in a monitoring area extracted as a high risk area among the target traffic area by the predictor 62, on the basis of the prediction result from the traffic participant risk predictor 625 of the predictor 62, the recognition information acquired by the target traffic area recognizer 60 and the driving subject information acquired by the driving subject information acquirer 61.

More specifically, the risk notification specifier 64 sets an operation manner of the risk notification of individual setting targets present in the monitoring area on the basis of information related to the monitoring area among the recognition information acquired by the target traffic area recognizer 60, information related to the monitoring area among the driving subject information acquired by the driving subject information acquirer 61, and the prediction result for the monitoring area by the traffic participant risk predictor 625. In other words, the risk notification specifier 64 sets the risk notification set value to one of "0", "1", "2", "3" and "4" for each of the setting targets.

In this manner, the risk notification specifier 64 sets an operation manner of the risk notification for each of the setting targets present in the monitoring area, and thus, for example, in a case where occurrence of a contact risk of parties that are a plurality of setting targets is predicted within the monitoring area by the traffic participant risk predictor 625, it is possible to turn ON/OFF the risk notification to the plurality of prediction parties predicted to be involved with the contact risk at different timings and make risk notifications at the same time in different notification modes. Hereinafter, processing of setting an appropriate operation manner of the risk notification for each of the setting targets by the risk notification specifier 64 will be also referred to as "risk notification optimization processing".

Figure 5:
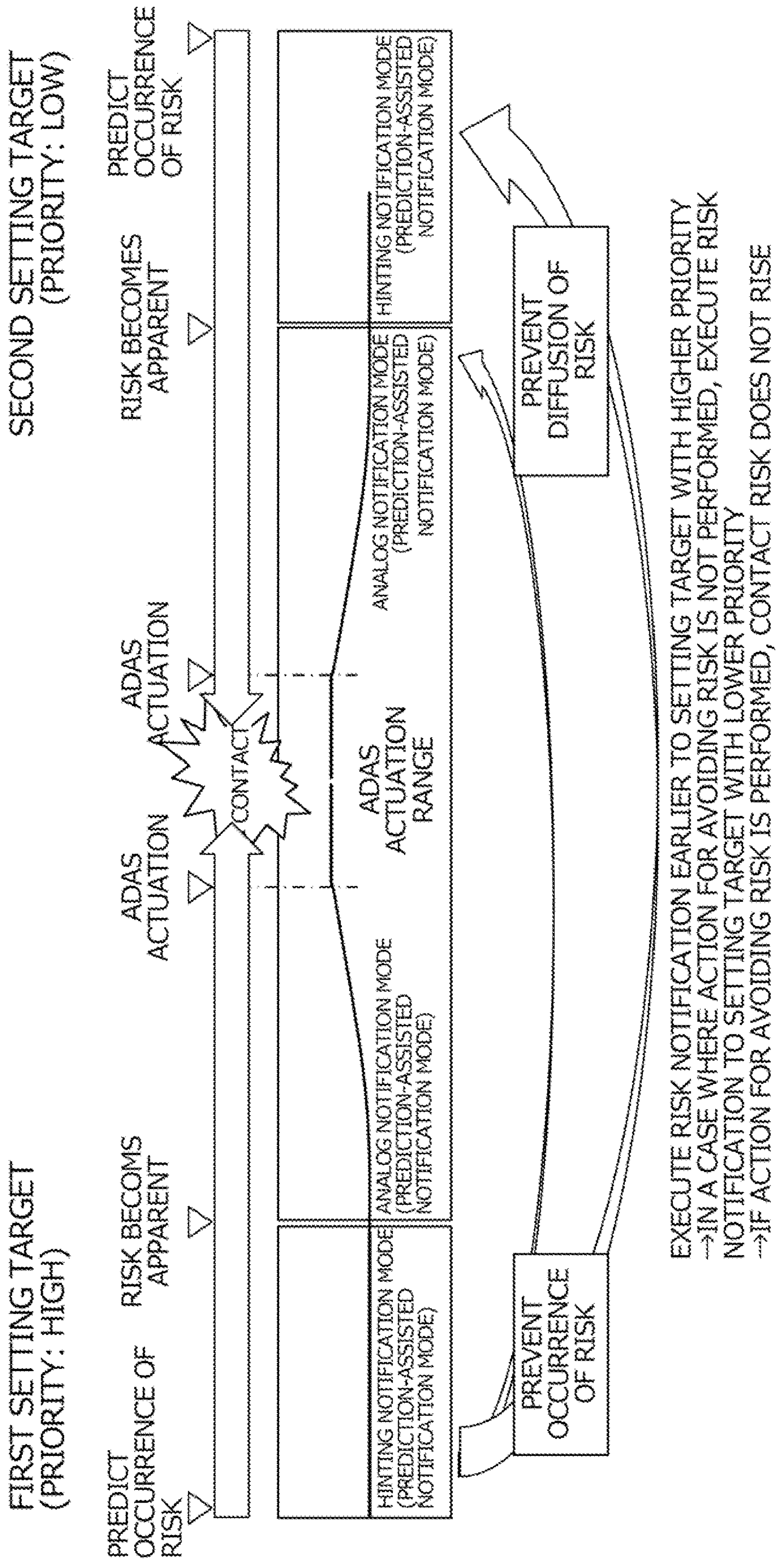
FIG. 5 is a view schematically illustrating concept of risk notification optimization processing in a risk notification specifier.

FIG. 5 is a view schematically illustrating concept of the risk notification optimization processing at the risk notification specifier 64. Note that while in the following description, procedure of the risk notification optimization processing will be described using a case as an example where, for example, occurrence of a contact risk between two parties (that is, a first setting target (mobile body) and a second setting target (mobile body)) is predicted by the traffic participant risk predictor 625, the present invention is not limited to this. The present invention can be easily generalized to a case where a contact risk of two parties, one of which is a pedestrian, is predicted and a case where occurrence of a contact risk among three parties is predicted, and thus, description will be omitted.

Further, a left part of FIG. 5 schematically indicates transition of the operation manner of the risk notification in the first setting target, and a right part of FIG. 5 schematically indicates transition of the operation manner of the risk notification in the second setting target. Further, two arrows at the top in FIG. 5 schematically indicate a period from when occurrence of a contact risk is predicted for the first time by the traffic participant risk predictor 625 until when the first setting target comes into contact with the second setting target, that is, a predicted period until a possible collision. However, these two arrows merely schematically indicate the predicted period until a possible collision and do not mean that the risk notification optimization processing at the risk notification specifier 64 cannot be executed unless the predicted period until a possible collision is clearly calculated at the traffic participant risk predictor 625. The risk notification optimization processing at the risk notification specifier 64 can be executed before a predicted period until a possible collision is clearly calculated by the traffic participant risk predictor 625. Further, FIG. 5 illustrates a case where the risk notification to the first setting target and the second setting target is set OFF (that is, the risk notification setting value is "0") at a time point at which occurrence of a contact risk is predicted for the first time by the traffic participant risk predictor 625.

In a case where occurrence of a contact risk of parties that are a plurality of support targets is predicted within the monitoring area by the traffic participant risk predictor 625, the risk notification specifier 64 sets priority to the plurality of prediction parties (in the example in FIG. 5, the first setting target and the second setting target) involved with the contact risk on the basis of content of the contact risk predicted at the beginning by the traffic participant risk predictor 625. The priority specifies order of setting ON of the risk notification (particularly, the risk notification under a hinting notification mode) as will be described later, and the risk notification is set ON earlier for the setting target for which the priority is set higher than the setting target for which the priority is set lower. Note that FIG. 5 illustrates a case where the priority of the first setting target is set higher than the priority of the second setting target.

Here, the risk notification specifier 64 sets priority for each of the setting targets so as to avoid the predicted contact risk from becoming apparent or occurring and prevent disorder of a traffic stream among these setting targets. More specifically, the risk notification specifier 64, for example, may specify a risk inducer that induces the contact risk among the plurality of prediction parties involved with the contact risk by referring to the prediction result from the traffic participant risk predictor 625, the recognition information by the target traffic area recognizer 60, the driving subject information by the driving subject information acquirer 61, and the like, and may set priority higher to the risk inducer than priority set to other prediction parties except the risk inducer. By setting the priority of the risk inducer higher in this manner and setting ON of the risk notification earlier than the risk notification to other setting targets, action of the risk inducer can be changed before the risk notification to other setting targets is set ON, so that it is possible to avoid the contact risk predicted at the beginning from becoming apparent or occurring.

Here, examples of the risk inducer can include a person who performs action that is highly likely to induce the contact risk as described above (for example, sudden acceleration, sudden deceleration, sudden lane change, interruption, action of closing a distance to a preceding vehicle or subsequent vehicle, action of continuously traveling across lanes, swerving, wrong-way driving, ignoring a traffic light, action of traveling at higher speed than surrounding mobile bodies by equal to or greater than predetermined speed, action of traveling at lower speed than surrounding mobile bodies by equal to or greater than predetermined speed, action of traveling at higher speed than speed limit by equal to or greater than predetermined speed, action of traveling at lower speed than speed limit by equal to or greater than predetermined speed, and action of inhibiting movement of surrounding traffic participants).

Further, the risk notification specifier 64 may set priority on the basis of traffic environments of the individual setting targets. More specifically, priority may be set higher to a prediction party that is in a traffic environment where it is difficult to recognize presence of other prediction parties among the plurality of prediction parties than priority set to other prediction parties, and the risk notification may be set ON earlier than the risk notification set to other setting targets. This makes it possible to improve cognitive capability of the setting target for which the priority is set higher, so that it is possible to avoid the contact risk predicted at the beginning from becoming apparent or occurring.

The risk notification specifier 64 determines whether or not the contact risk predicted at the beginning becomes apparent with a predetermined period after the priority is set for each of the setting targets through the procedure as described above in response to occurrence of the contact risk being predicted by the traffic participant risk predictor 625. More specifically, in a case where, for example, occurrence of a contact risk is predicted by the traffic participant risk predictor 625, and a predicted period until a possible collision for the contact risk is equal to or greater than a predetermined apparent threshold (including a case where the predicted period until a possible collision is not clearly calculated by the traffic participant risk predictor 625), the risk notification specifier 64 determines that the contact risk does not become apparent (that is, the contact risk is potential). Further, for example, in a case where the predicted period until a possible collision calculated by the traffic participant risk predictor 625 becomes less than the above-described apparent threshold, the risk notification specifier 64 determines that the contact risk becomes apparent. Here, as illustrated in FIG. 5, the apparent threshold that is a threshold for the predicted period until a possible collision is set so as to be wider than an ADAS actuation range, in other words, longer than a predicted period until a possible collision during which execution of collision mitigation brake control, collision avoidance steering control, and the like, are started by the driving support ECU mounted on each mobile body.

Further, the risk notification specifier 64 starts the risk notification in the hinting notification mode preferentially to a setting target for which the priority is set higher (in the example in FIG. 5, the first setting target) until it is determined that the contact risk predicted at the beginning becomes apparent, that is, while it is determined that the contact risk is potential. In other words, the risk notification specifier 64 sets the risk notification set value to "1" or "3" preferentially to setting targets for which the priority is set higher. By this means, there is a case where a driver who is a setting target and who receives a risk notification in this hinting notification mode performs action of avoiding the predicted contact risk as a result of recognizing presence of a mobile body (in the example in FIG. 5, the second setting target) that is likely to come into contact with the own vehicle. In a case where the driver receiving such a risk notification performs action for avoiding the contact risk, there is a case where the traffic participant risk predictor 625 predicts that the contact risk predicted to occur at the beginning does not occur before the contact risk becomes apparent.

Further, the risk notification specifier 64 starts the risk notification to the setting target for which the priority is set lower (in the example in FIG. 5, the second setting target) in the hinting notification mode a predetermined period after the risk notification to the setting target for which the priority is set higher is started in the hinting notification mode. In other words, the risk notification specifier 64 sets the risk notification set value to the setting target for which the priority is set lower to "1" or "3" a predetermined period after the risk notification set value to the setting target for which the priority is set higher to "1" or "3". Note that the risk notification specifier 64 may avoid the risk notification to the setting target for which the priority is set lower in the hinting notification mode until the contact risk becomes apparent to prevent disorder of a traffic stream of the setting target for which the priority is set lower. Further, by making the risk notification to the setting target for which higher priority is set in the hinting notification mode earlier as described above, there is a case where occurrence of the contact risk is avoided, and thus, the risk notification specifier 64 may start the risk notification to the setting target for which lower priority is set in the hinting notification mode in a case where the driver of the setting target for which higher priority is set does not perform action of avoiding the contact risk even after a predetermined period has elapsed after the risk notification to the setting target for which higher priority is set is started in the hinting notification mode.

Further, the risk notification specifier 64 starts the risk notification to all the prediction parties involved with the contact risk in the analog notification mode after it is determined that the contact risk predicted at the beginning becomes apparent. In other words, the risk notification specifier 64 sets the risk notification set values for all the prediction parties to "2" or "4" after it is determined that the contact risk becomes apparent. As described above, in the analog notification mode, the notification intensity becomes higher as the predicted period until a possible collision shortens, so that it is possible to give a sense of danger with respect to the contact risk that comes near to all the prediction parties involved with the contact risk and cause the prediction parties to perform action for avoiding the contact risk.

Returning to FIG. 2, the coordination support information notifier 65 generates coordination support information for encouraging the individual traffic participants recognized as support targets by the target traffic area recognizer 60 to perform communication with surrounding traffic participants and recognize a surrounding traffic environment on the basis of the recognition information acquired by the target traffic area recognizer 60, the driving subject information acquired by the driving subject information acquirer 61, the prediction result regarding the monitoring area by the traffic participant risk predictor 625, information regarding a level of risk for each of the local areas by the area risk predictor 620 (hereinafter, also referred to as "risk area information"), information regarding the soundness-promoting set value set by the soundness-promoting notification specifier 63, and information regarding the risk notification set value set by the risk notification specifier 64 and transmits the generated coordination support information to each traffic participant.

Here, the coordination support information notifier 65 transmits coordination support information including information regarding the risk notification set value set on the basis of the prediction result from the traffic participant risk predictor 625 and risk area information generated on the basis of the estimation result from the area risk predictor 620 to support targets present within the monitoring area (that is, the high risk area) that is targeted by the traffic participant risk predictor 625 among a plurality of support targets present in the whole target traffic area.

Further, the coordination support information notifier 65 transmits coordination support information including the risk area information generated on the basis of the estimation result from the area risk predictor 620 to support targets present within a low risk area not extracted as the high risk area by the area risk predictor 620 among the plurality of the support targets present in the whole target traffic area.

According to the traffic safety support system 1 and the learning method thereof according to the present embodiment, the following effects are provided.

(1) The traffic safety support system 1 includes the target traffic area recognizer 60 configured to recognize recognition targets including traffic participants (including persons and mobile bodies) in the target traffic area 9 and traffic environments of the traffic participants and acquire recognition information regarding the recognition targets, a predictor 62 configured to predict a risk in the target traffic area 9 on the basis of the recognition information, and a coordination support information notifier 65 configured to transmit support information generated on the basis of the recognition information and a prediction result from the predictor 62 to support targets determined in advance from among a plurality of the traffic participants in the target traffic area 9. Further, in the predictor 62, the area risk predictor 620 extracts, from a plurality of local areas obtained by subdividing the target traffic area 9, at least one area as a high risk area, and the traffic participant risk predictor 625 predicts a risk in future of traffic participants in the high risk area. Here, upon extraction of the high risk area from a plurality of local areas, the area risk predictor 620 can extract the high risk area with less load than in a case where an enormous amount of recognition information regarding the recognition targets in the target traffic area 9 is utilized as is, by using information obtained by performing statistical processing on the recognition information. Further, when predicting a risk in the future of traffic participants in the monitoring area set as the high risk area, the traffic participant risk predictor 625 can predict a risk in the future of the traffic participants with less load than in a case where an enormous amount of recognition information regarding the recognition targets in the target traffic area 9 is utilized as is, by using information related to the monitoring area among the recognition information regarding the recognition targets in the whole target traffic area 9. Thus, according to the traffic safety support system 1, appropriate support information generated on the basis of the prediction result can be provided in real time to the traffic participants in the high risk area, so that it is possible to improve safety, convenience and smoothness of traffic in the target traffic area 9.

(2) In the traffic safety support system 1, the traffic participant risk predictor 625 does not predict a risk in the future of traffic participants in other low risk areas not extracted as the high risk area by the area risk predictor 620 from among the plurality of local areas. Thus, according to the traffic safety support system 1, it is possible to reduce load required for operation compared to a case where prediction processing is performed on all the local areas by the traffic participant risk predictor 625. Further, according to the traffic safety support system 1, load required for operation can be reduced by narrowing down the number of local areas on which prediction processing is to be performed, so that it is possible to improve prediction accuracy of a risk of traffic participants in the high risk area correspondingly. Thus, according to the traffic safety support system 1, appropriate support information generated on the basis of a prediction result with high accuracy by the traffic participant risk predictor 625 can be provided in real time to the traffic participants in the high risk area, so that it is possible to improve safety, convenience and smoothness of traffic in the target traffic area 9.

(3) In the traffic safety support system 1, the area risk predictor 620 estimates a level of risk for each of the local areas and extracts a high risk area from a plurality of local areas on the basis of the estimation result of the level of the risk. Further, the coordination support information notifier 65 transmits coordination support information including information regarding the risk notification set value generated at the risk notification specifier 64 on the basis of a relatively detailed prediction result from the traffic participant risk predictor 625, to support targets present in the high risk area from among a plurality of the support targets in the whole target traffic area 9. This makes it possible to improve safety, convenience and smoothness of traffic for traffic participants in the high risk area. Further, the coordination support information notifier 65 transmits coordination support information including the risk area information generated on the basis of the estimation result for each local area by the area risk predictor 620, to support targets present in the low risk area outside the high risk area from among the plurality of support targets in the whole target traffic area 9. This makes it possible to also improve safety, convenience and smoothness of traffic for traffic participants in the low risk area. In this manner, in the traffic safety support system 1, by changing content of the coordination support information in accordance with a level of risk for each of the local areas, it is possible to improve safety, convenience and smoothness of traffic for traffic participants in the whole target traffic area 9.

(4) The first learning method includes preparing learning data using input data to the macro risk estimation model 623 generated on the basis of the recognition information and an output from the micro risk estimation model 628, the output being provided in response to an input of the recognition information to the micro risk estimation model 628 and further learning the macro risk estimation model 623 using the learning data. In typical model learning, it is necessary to prepare correct data for evaluating whether an output from the model is right or wrong. In contrast, in the first learning method, an output from the micro risk estimation model 628 can be utilized as learning data for learning the macro risk estimation model 623, so that it is possible to construct the macro risk estimation model 623 with high accuracy using a relatively simple method. Thus, according to the first learning method, it is possible to improve accuracy of the macro risk estimation model while operating a service of providing coordination support information to each traffic participant.

(5) The second learning method includes preparing learning data using input data to the macro risk estimation model 623 generated on the basis of first recognition information acquired in a first period and correct data with respect to an output from the micro risk estimation model 628 generated on the basis of second recognition information acquired in a second period immediately after the first period, and further learning an overall model that is a combination of the macro risk estimation model 623 and the micro risk estimation model 628 using the learning data. Thus, according to the second learning method, the second recognition information obtained in the second period immediately after the first period can be utilized as data for evaluating whether an output from the overall model when the first recognition information is input is right or wrong, so that it is possible to improve accuracy of the overall model that is a combination of the macro risk estimation model 623 and the micro risk estimation model 628. Thus, according to the traffic safety support system 1, it is possible to improve accuracy of the overall model while operating a service of providing coordination support information to each traffic participant.

While one embodiment of the present invention has been described above, the present invention is not limited to this. Detailed configurations may be changed as appropriate within a scope of the gist of the present invention.

What is claimed is:

1. A traffic safety support system comprising:

a recognizer configured to recognize recognition targets including traffic participants as persons or mobile bodies in a target traffic area and traffic environments of the traffic participants, and acquire recognition information regarding the recognition targets;

a predictor configured to predict a risk in the target traffic area on a basis of the recognition information; and a transmitter configured to transmit support information generated on a basis of the recognition information and a prediction result from the predictor, to support targets determined from among a plurality of the traffic participants in the target traffic area via wireless communication, thereby causing human machine interfaces installed in the support targets to operate in a manner determined based on the support information, the predictor comprising:

an area risk predictor configured to extract, from a plurality of local areas obtained by subdividing the target traffic area, at least one local area with a high level of risk as a high risk area, on a basis of information obtained by performing statistical processing on the recognition information; and a traffic participant risk predictor configured to perform processing for predicting a risk in future of traffic participants present in the high risk area extracted by the area risk predictor, on a basis of information related to the high risk area and included in the recognition information.

2. The traffic safety support system according to claim 1, wherein the traffic participant risk predictor does not perform the processing for predicting a risk on a local area that is included in the plurality of local areas and is not extracted as the high risk area by the area risk predictor.

3. The traffic safety support system according to claim 1, wherein the area risk predictor estimates the level of risk for each of the local areas, and the transmitter transmits first support information generated on a basis of a prediction result from the traffic participant risk predictor to support targets present in the high risk area from among a plurality of the support targets, and transmits second support information generated on a basis of an estimation result from the area risk predictor to support targets present in a low risk area outside the high risk area.

4. A learning method executable by the traffic safety support system according to claim 1, wherein the area risk predictor extracts the high risk area by utilizing a macro risk estimation model that outputs a level of risk for each of the plurality of local areas upon receiving an input of information obtained by performing statistical processing on the recognition information, and the traffic participant risk predictor predicts a risk in future of traffic participants present in the high risk area by utilizing a micro risk estimation model that outputs, upon receiving an input of information related to a predetermined local area and included in the recognition information, a risk in future of traffic participants present in the local area, the learning method comprising:

a step of preparing learning data using input data to the macro risk estimation model generated on a basis of the recognition information and an output from the micro risk estimation model, the output being provided in response to an input of the recognition information to the micro risk estimation model; and a step of learning the macro risk estimation model using the learning data.

5. A learning method executable by the traffic safety support system according to claim 1, wherein the area risk predictor extracts the high risk area by utilizing a macro risk estimation model that outputs a level of risk for each of a plurality of the local areas upon receiving an input of information obtained by performing statistical processing on the recognition information and, the traffic participant risk predictor predicts a risk in future of traffic participants in the high risk area by utilizing a micro risk estimation model that outputs, upon receiving an input of information related to a predetermined local area and included in the recognition information, a risk in future of traffic participants in the predetermined local area, the learning method comprising:

a step of preparing learning data using input data to the macro risk estimation model generated on a basis of first recognition information acquired in a predetermined first period and correct data with respect to an output from the micro risk estimation model generated on a basis of second recognition information acquired in a second period immediately after the first period; and a step of learning an overall model that is a combination of the macro risk estimation model and the micro risk estimation model using the learning data.

* * * * *